(12) United States Patent
Rivlin et al.

(10) Patent No.: US 12,513,220 B2
(45) Date of Patent: Dec. 30, 2025

(54) APPARATUS, SYSTEM, AND METHOD OF PROVIDING ACCESS TO A SUBSCRIPTION-RESTRICTED SERVICE OF AN APPLICATION

(71) Applicant: Intel Corporation, Santa Clara, CA (US)

(72) Inventors: Ofer Rivlin, Tel Aviv (IL); David Birnbaum, Modiin (IL)

(73) Assignee: INTEL CORPORATION, Santa Clara, CA (US)

( * ) Notice: Subject to any disclaimer, the term of this patent is extended or adjusted under 35 U.S.C. 154(b) by 11 days.

(21) Appl. No.: 18/529,899

(22) Filed: Dec. 5, 2023

(65) Prior Publication Data

US 2025/0184404 A1 Jun. 5, 2025

(51) Int. Cl.
*G06F 15/16* (2006.01)
*H04L 67/306* (2022.01)
*H04L 67/53* (2022.01)

(52) U.S. Cl.
CPC .......... *H04L 67/53* (2022.05); *H04L 67/306* (2013.01)

(58) Field of Classification Search
CPC .............................. H04L 67/53; H04L 67/306
USPC .................................................... 709/217
See application file for complete search history.

(56) References Cited

U.S. PATENT DOCUMENTS

| | | | |
|---|---|---|---|
| 8,918,411 B1 * | 12/2014 | Latif | G06F 16/9535 |
| | | | 707/790 |
| 10,447,786 B1 | 10/2019 | Arnberg et al. | |
| 2018/0091506 A1 | 3/2018 | Chow et al. | |
| 2020/0175590 A1 * | 6/2020 | Huo | H04L 9/50 |
| 2021/0006964 A1 * | 1/2021 | Lee | H04W 8/205 |
| 2023/0027672 A1 * | 1/2023 | Khan | H04W 76/38 |

FOREIGN PATENT DOCUMENTS

EP 2 866 413 4/2015

OTHER PUBLICATIONS

Search Report for European Patent Application No. 24217385.4, mailed on Apr. 7, 2025, 8 pages.

* cited by examiner

*Primary Examiner* — Alan S Chou
(74) *Attorney, Agent, or Firm* — Shichrur & Co.

(57) ABSTRACT

For example, a computing system may be configured to provide a first computing device and a second computing device, which is paired with the first computing device, with access to a subscription-restricted service of an application, for example, based on a subscription confirmation to confirm a subscription to the subscription-restricted service. For example, the computing system may be configured to identify a pairing between the first computing device and a third computing device, which is unsubscribed to the subscription-restricted service, and to assign the third computing device to the subscription and provide the third computing device with access to the subscription-restricted service, for example, based on the identification of the pairing between the first computing device and the third computing device.

20 Claims, 11 Drawing Sheets

APPARATUS, SYSTEM, AND METHOD OF PROVIDING ACCESS TO A SUBSCRIPTION-RESTRICTED SERVICE OF AN APPLICATION

BACKGROUND

Some applications may be configured to provide one or more restricted services to one or more users.

For example, an application may be configured to restrict access to one or more subscription-based services, for example, by only allowing users having a subscription to access the subscription-based services.

Some applications may be configured to provide access to both subscribed users as well as unsubscribed users.

For example, an application may provide one or more first services to all users, e.g., both subscribed users as well as unsubscribed users, and to restrict access to one or more second services.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
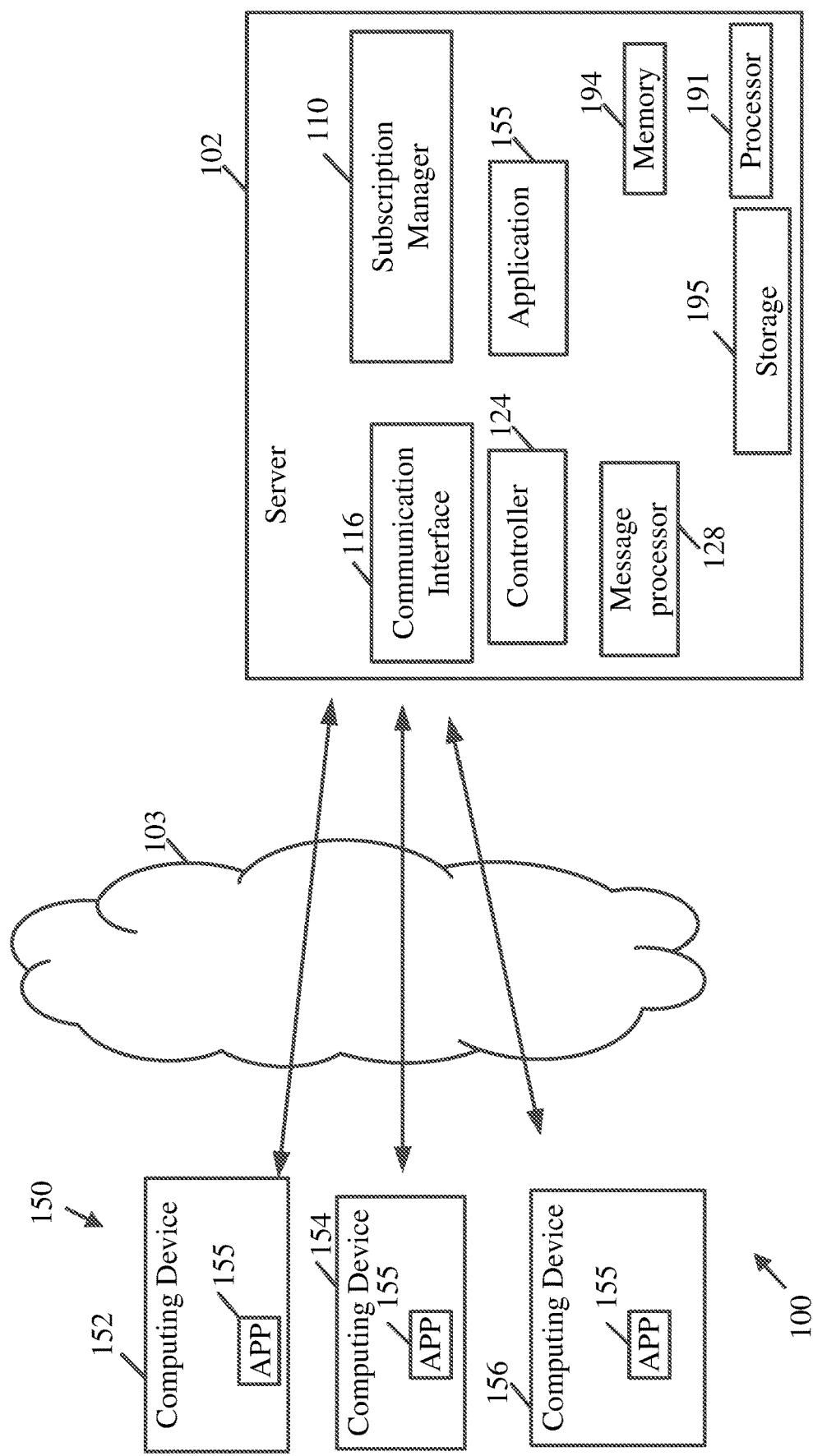
FIG. 1 is a schematic block diagram illustration of a computing system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a server, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing *IEEE 802.11 standards (including IEEE 802.11-2020 (IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications*, December 2020)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Reference is made to FIG. 1, which schematically illustrates a system 100, in accordance with some demonstrative aspects.

In some demonstrative aspects, system 100 may include a server 102, which may be configured to communicate with a plurality of computing devices 150, e.g., including a first computing device 152, a second device 154, and/or a third computing device 156.

For example, a computing device 150 may include, for example, a mobile device, a Smartphone, a tablet computer, a UE, an MD, a STA, a mobile computer, a laptop computer, an Ultrabook™ computer, a notebook computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a video source, an audio source, a video sink, an audio sink, a stereo tuner, a broadcast radio receiver, a digital audio player, a speaker, an audio receiver, an audio amplifier, a gaming device, a data source, a data sink, a media player, a music player, a smart device such as, for example, lamps, climate control, car components, household components, appliances, and the like.

In some demonstrative aspects, server 102 may include, for example, a server device, an edge server, a cloud server, an application server, a web server, a proxy server, and/or any other server.

In some demonstrative aspects, server 102 may include, for example, a processor 191, a memory unit 194, and/or a storage unit 195. The server 102 may optionally include other suitable hardware components and/or software components. In some demonstrative aspects, some or all of the components of server 102 may be enclosed in a common housing or packaging, and may be interconnected or operably associated using one or more wired or wireless links. In other aspects, components of one or more of server 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of server 102 and/or of one or more suitable applications.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a disk drive, a solid-state drive (SSD), and/or other suitable removable or non-removable storage units. Memory unit 194 and/or storage unit 195, for example, may store data processed by server 102.

In some demonstrative aspects, server 102 may be configured to communicate content, data, information and/or signals with the plurality of computing devices 150 via a communication network 103, e.g., as described below.

In some demonstrative aspects, communication network 103 may include any wired networks and/or wireless networks. In one example, communication network 103 may interface with computing devices 150 via a wireless medium (WM). For example, the wireless medium may include, a radio channel, a cellular channel, an RF channel, a Wi-Fi channel, a 5G channel, an IR channel, a Bluetooth (BT) channel, a Global Navigation Satellite System (GNSS) Channel, and/or the like.

In some demonstrative aspects, server 102 may include one or more communication interfaces 116 configured to communicate with the plurality of computing devices 150, and/or any other additional or alternative element and/or device of system 100, e.g. via communication network 103. For example, the one or more communication interfaces 116 may include one or more wireless communication interfaces, e.g., including one or more radios, to communicate over one or more wireless communication networks, and/or one or more wired communication interfaces to communicate over one or more wired networks.

In some demonstrative aspects, server 102 may include a controller 124, which may be configured to perform, and/or to trigger, cause, instruct and/or control server 102 to perform, one or more operations and/or communications, to generate and/or communicate one or more messages and/or transmissions, and/or to perform one or more functionalities, operations and/or procedures between server 102 and one or more other devices and/or entities of system 100, e.g., as described below.

In some demonstrative aspects, controller 124 may include, or may be implemented, partially or entirely, by circuitry and/or logic, e.g., one or more processors including circuitry and/or logic, memory circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a server, e.g., server 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, server 102 may include a message processor 128 configured to generate, process and/or access one or more messages communicated by server 102.

In one example, message processor 128 may be configured to generate one or more messages to be transmitted by server 102, and/or message processor 128 may be configured to access and/or to process one or more messages received by server 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wired and/or wireless communication medium. In other aspects, message processor 128 may be configured to perform any other additional or alternative functionality and/or may include any other additional or alternative components to generate and/or process a message to be transmitted.

In some demonstrative aspects, message processor 128 may include, or may be implemented, partially or entirely, by circuitry and/or logic, e.g., one or more processors including circuitry and/or logic, memory circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124. In other aspects, the functionality of message processor 128 may be implemented as part of any other element of server 102.

In some demonstrative aspects, system 100 may be configured to perform one or more operations and/or services of an application 155.

In some demonstrative aspects, server 101 may include and/or locally execute the application 155.

In some demonstrative aspects, one or more computing devices 150, e.g., some or all, of the plurality of computing devices 150 may include and/or locally execute the application 155.

In some demonstrative aspects, the computing device 150 may include a front-end of the application 155 to be executed locally by the computing device 150.

For example, the front-end of the application 155 may include and/or may be implemented as a local application, a client application and/or the like.

In some demonstrative aspects, the server 102 may include a back-end of the application 155 to be executed remotely by the server 102.

For example, the back-end of the application 155 may include and/or may be implemented as a server application, a cloud application, and or the like.

For example, one or more first operations of application 155 may be performed locally, for example, by the front-end in computing device 150, and/or one or more second operations of application 155 may be performed remotely, for example, by the back-end in server 102.

In some demonstrative aspects, a session of a service of the application 155 may involve a pair of participating devices, e.g., as described below.

In some demonstrative aspects, the pair of participating devices may include a participating hub device and a participating non-hub device, which may be paired with the participating hub device, e.g., as described below.

In one example, computing device 152 may include, and/or nay be configured to operate as, perform a role of, and/or perform one or more functionalities of, a hub device, which may perform a hub functionality according to the application 155.

For example, computing device 154 may include, and/or nay be configured to operate as, perform a role of, and/or perform one or more functionalities of, a non-hub device, which may perform a non-hub functionality according to the application 155. For example, the non-hub device implemented by computing device 154 may be paired with the hub device implemented by computing device 152.

In one example, computing device 152 may include a PC and computing device 154 may include a tablet. According to this example, a session of a service of the application 155 may include extending a display of the PC over a display of the tablet.

In another example, computing device 152 may include a PC and computing device 154 may include a smartphone. According to this example, a session of a service of the application 155 may include sharing and/or displaying messages from the smartphone on a display of the PC.

In some demonstrative aspects, server 102 may include a subscription manager 110, which may be configured to manage subscriptions to one or more services of the application 155, e.g., as described below.

In some demonstrative aspects, at least part of the functionality of subscription manager 110 may be implemented as part of controller 124.

In some demonstrative aspects, at least part of the functionality of subscription manager 110 may be implemented as part of application 155.

In other aspects, the functionality of subscription manager 110 may be implemented as part of any other element of server 102.

In some demonstrative aspects, subscription manager 110 may be configured to manage subscriptions to the one or more services of the application 155, for example, across computing devices using the application 155, for example, some or all of the plurality of computing devices 150, e.g., as described below.

In some demonstrative aspects, subscription manager 110 may be configured to manage and/or to provide, e.g., propagate, anonymous subscriptions to the one or more services of the application 155, for example, across some or all of the computing devices using the application 155, e.g., as described below.

In some demonstrative aspects, subscription manager 110 may be configured to provide a technical solution to monetize subscriptions to one or more services of an application, which may be executed on multiple devices, e.g., as described below.

In some demonstrative aspects, subscription manager 110 may be configured to provide a technical solution to monetize subscriptions to one or more services of an application, e.g., which may run on multiple devices, for example, without even requiring a user of the application to logon to the services, for example, on each device of the multiple devices, e.g., as described below.

In some demonstrative aspects, subscription manager 110 may be configured to provide a technical solution to monetize subscriptions to one or more services of an application, for example, by providing and/or propagating a subscription across multiple devices, for example, without even identifying a user and/or tying the subscription to the user, e.g., as described below.

In some demonstrative aspects, in some use cases, and/or scenarios, there may be one or more technical inefficiencies, disadvantages and/or problems in implementing cloud services that offer personalized subscription flows including anonymous purchases, e.g., in the form of "unregistered user purchases". For example, these cloud services may manage a subscription lifecycle, for example, by implementing server-to-server-notifications with a back-end of an application.

In one example, an anonymous identifier of a user of such cloud service may remain consistent, for example, as long as the user keeps the application on its device. Accordingly, the user may not be able to keep the subscription, for example, when switching from a first device, e.g., using an Android OS, to a second device, e.g., using an iPhone OS (IOS).

In another example, the user of such cloud service may not be able to use a single subscription with two different devices, e.g., a device with an Android OS, and a device with an IOS. As a result, the user may have to pay twice for the same subscription, for example, in order to use the subscription with the two devices.

In another example, the user of such cloud services may be limited to using the subscription on a single device, and may not be able, for example, to transfer the subscription to any other devices associated with the user.

In some demonstrative aspects, in some use cases, and/or scenarios, there may be one or more technical inefficiencies, disadvantages and/or problems in some types of applications implementing an anonymous subscription.

In one example, such applications may enable the anonymous subscription for only one device, e.g., a device from which the subscription is paid. For example, an anonymity of the user may be lost, for example, when associating an anonymous subscription with another account.

In some demonstrative aspects, in some use cases, and/or scenarios, there may be one or more technical inefficiencies, disadvantages and/or problems to manage subscriptions with respect to applications that may run over multiple of devices. For example, these applications may enable account subscription payment and management via internet application providers. e.g., via application (app) stores (app-stores).

In one example, these applications may identify that a device belongs to a user through a user account login. For example, the user account login may require using user account credentials, for example, to login to different devices. For example, using the user account credentials may cancel the anonymity of the user.

In some demonstrative aspects, subscription manager 110 may be configured to provide a technical solution to support a complete anonymous subscription experience for a user, e.g., as described below.

In some demonstrative aspects, subscription manager 110 may be configured to provide a technical solution to support a complete subscription experience, for example, throughout a plurality of, e.g., all devices, of a user under one subscription, e.g., as described below.

In some demonstrative aspects, subscription manager 110 may be configured to provide a technical solution to support the complete subscription experience to a plurality of devices of the user, for example, while maintaining complete anonymity of the user, e.g., as described below.

In some demonstrative aspects, subscription manager 110 may be configured to provide a technical solution to subscribe a plurality of devices, e.g., all devices, of a user under one subscription, for example, by allowing the user to subscribe to a subscription, e.g., only once, for example, from one of the devices associated with the user, e.g., as described below.

In some demonstrative aspects, subscription manager 110 may be configured to provide a technical solution to support a complete subscription experience throughout a plurality of devices of the user, for example, based on a onetime payment, e.g., to a subscription provider, or an already paid subscription, e.g., a purchased PC with a subscription, e.g., as described below.

In some demonstrative aspects, subscription manager 110 may be configured to provide a technical solution to identify a plurality of, e.g., all, devices of an anonymous user, and to propagate a subscription to the plurality of, e.g., all, the devices of the anonymous user, e.g., as described below.

In some demonstrative aspects, subscription manager 110 may be configured to provide a technical solution to provide users with a same level of subscription experience, for example, even without having any knowledge about the users themselves, e.g., as described below.

For example, subscription manager 110 may be configured to provide a subscription experience to a user, for example, even without having any knowledge of registration of the user, and/or even without managing credentials of the user, e.g., as described below.

In some demonstrative aspects, subscription manager 110 may be configured to provide a technical solution to support a user to switch between devices under one anonymous subscription, and/or to maintain the anonymous subscription on multiple devices, for example, until the anonymous subscription expires, e.g., as described below.

In some demonstrative aspects, subscription manager 110 may be configured to provide a technical solution to support a mechanism ("follow the money" mechanism), in which a subscription may include a logical entity, to which a plurality of devices may be associated.

In some demonstrative aspects, subscription manager 110 may be configured to maintain a logical entity ("subscription object"), and may add to the subscription object a child entity, e.g., a hub device, that a paying device, e.g., a device associated with the subscription, connects with.

In some demonstrative aspects, subscription manager 110 may be configured to add to the subscription object a plurality of child entities, for example, up to a predefined maximal number of hub devices, which may be allowed per subscription.

In some demonstrative aspects, subscription manager 110 may be configured to identify a subscribed device as a guest device to a subscription, for example, based on a determination that the subscribed device belongs to another 'Subscription'. For example, a subscribed device may be identified as a guest device, for example, in case where two different devices, which are associated with two different subscriptions, are used.

In some demonstrative aspects, subscription manager 110 may be configured to provide a technical solution, which may result with an increased number of users of an application. For example, more users may want to use such a solution, e.g., as there may be no threat to an anonymity of the users.

In some demonstrative aspects, subscription manager 110 may be configured to provide a technical solution to reduce risks for a provider of an application, for example, by avoiding the storage of Personally Identifiable Information (PII).

In some demonstrative aspects, subscription manager 110 may be configured to provide the first computing device 152 and the second computing device 154, which may be paired with the first computing device 152, with access to a subscription-restricted service of the application 155, for example, based on a subscription confirmation to confirm a subscription to the subscription-restricted service of the application 155, e.g., as described below.

In some demonstrative aspects, subscription manager 110 may be configured to identify a pairing between the first computing device 152 and a third computing device 156, which is unsubscribed to the subscription-restricted service, e.g., as described below.

In some demonstrative aspects, subscription manager 110 may be configured to assign the third computing device 156 to the subscription and/or to provide the third computing device 156 with access to the subscription-restricted service, for example, based on the identification of the pairing between the first computing device 152 and the third computing device 156, e.g., as described below.

In some demonstrative aspects, subscription manager 110 may be configured to perform one or more operations and/or functionalities of a capabilities manager (also referred to "device capabilities configuration manager") to manage one or more capabilities of the application 155 to be provided to one or more of the computing devices 150, e.g., as described below.

In some demonstrative aspects, subscription manager 110 may be configured to perform one or more operations and/or functionalities of the device capabilities configuration manager, for example, to manage, control and/or restrict one or more capabilities of the application 155, e.g., services, features, and/or the like, which may be executed by a computing device 150, e.g., as described below.

In some demonstrative aspects, subscription manager 110 may be configured to perform one or more operations and/or functionalities of the device capabilities configuration manager, for example, to provide to the application 155 executed by a computing device 150 an indication of one or more capabilities of the application 155, e.g., services, features, and/or the like, which the computing device 150 may be allowed to execute, e.g., as described below.

In some demonstrative aspects, subscription manager 110 may be configured to perform one or more operations and/or functionalities of the device capabilities configuration manager, for example, to indicate to the application 155 executed at a first computing device, e.g., computing device 152, that one or more first services of the application 155 are to be allowed to be executed at the first computing device, e.g., as described below.

In some demonstrative aspects, subscription manager 110 may be configured to perform one or more operations and/or functionalities of the device capabilities configuration manager, for example, to indicate to the application 155 executed at a second computing device, e.g., computing device 154, that one or more second services of the application 155 are to be allowed to be executed at the second computing device, e.g., as described below.

In some demonstrative aspects, the one or more first services of the application 155 may be different from the one or more second services of the application 155, e.g., as described below.

In some demonstrative aspects, subscription manager 110 may be configured to perform one or more operations and/or functionalities of the device capabilities configuration manager, for example, to indicate to an unsubscribed device that the one or more first services of the application 155 are allowed to be executed by the unsubscribed device, e.g., as described below.

In some demonstrative aspects, the one or more first services may be provided by a first version of the application 155, e.g., as described below.

In some demonstrative aspects, the first version of the application 155 may include a non-subscription version of the application 155, which does not require a subscription, e.g., as described below.

In one example, the first version of the application 155 may include a free version of the application 155, e.g., as described below.

In some demonstrative aspects, the one or more second services may be provided by a second version of the application 155, e.g., as described below.

In some demonstrative aspects, the second version of the application 155 may include a subscription-based version of the application 155, which requires a subscription, e.g., as described below.

In one example, the second version of the application 155 may include a professional (PRO) version of the application 155, e.g., as described below.

In other aspects, the device capabilities configuration manager may be configured to manage the services provided by the application 155 according to any other additional or alternative criteria.

In some demonstrative aspects, subscription manager 110 may be configured to perform one or more operations and/or functionalities of the device capabilities configuration manager, for example, to indicate to the application 155 executed at an unsubscribed device that the unsubscribed device is to be limited to the first services, for example, the services of the free version of the application 155, e.g., as described below.

In some demonstrative aspects, subscription manager 110 may be configured to perform one or more operations and/or functionalities of the device capabilities configuration manager, for example, to indicate to the application 155 executed at a subscribed device that the subscribed device is to be allowed to execute the second services of the application 155, for example, the services of the PRO version of the application 155, e.g., as described below.

In some demonstrative aspects, subscription manager 110 may be configured to perform one or more operations and/or functionalities of the device capabilities configuration manager, for example, to provide a technical solution to prevent malicious users from executing the application 155 to use one or more subscription-based services, for example, without obtaining a subscription and/or making a payment, e.g., as described below.

In some demonstrative aspects, the subscription confirmation may confirm, for example, that the first computing device 152 is to be assigned to the subscription, e.g., as described below.

In some demonstrative aspects, the subscription confirmation may confirm, for example, that the second computing device 154 is to be assigned to the subscription, e.g., as described below.

In some demonstrative aspects, the subscription confirmation may confirm, for example, that another computing device, e.g., which is paired with the first computing device 152 or the second computing device 154, is to be assigned to the subscription, e.g., as described below.

In some demonstrative aspects, the subscription confirmation may include an anonymous payment receipt, e.g., as described below.

In one example, the subscription confirmation may be obtained from an application (App) store, a Play store, and/or any other suitable store.

In another example, the subscription confirmation may be obtained via an Original Equipment Manufacturer (OEM) of a computing device, or a model prepaid subscription.

In another example, the subscription confirmation may be obtained via a voucher, a promo code, and/or the like.

In other aspects, the subscription confirmation may be obtained via any other additional or alternative service and/or provider.

In some demonstrative aspects, the subscription confirmation may include terms-of-use information to define one or more terms of use for the subscription, e.g., as described below.

In some demonstrative aspects, the one or more terms of use for the subscription may include a maximal count of computing devices to be assigned to the subscription, e.g., as described below.

In some demonstrative aspects, the one or more terms of use for the subscription may include expiration information to indicate a condition for expiration of the subscription, e.g., as described below.

In other aspects, the terms-of-use information may include any other additional and/or alternative information to define the terms of use of the subscription.

In other aspects, the subscription confirmation may include any other additional and/or alternative information.

In some demonstrative aspects, subscription manager 110 may be configured to restrict access to the subscription-restricted service, for example, according to the one or more terms of use for the subscription, e.g., as described below.

In some demonstrative aspects, subscription manager 110 may be configured to identify one of the first computing device 152 or the second computing device 154 as a hub device to perform a hub functionality according to the application 155, e.g., as described below.

In some demonstrative aspects, subscription manager 110 may be configured to identify an other one of the first computing device 152 or the second computing device 154 as a non-hub device to perform a non-hub functionality according to the application 155, e.g., as described below.

In one example, the hub device may include a PC of a user, which may be connected to one or more smart devices, phones, tablets, and/or the like, of the user.

In some demonstrative aspects, execution of a session of the subscription-restricted service may involve a pair of participating devices, e.g., as described below.

In some demonstrative aspects, the pair of participating devices may include a participating hub device and a participating non-hub device, which may be paired with the participating hub device, e.g., as described below.

In some demonstrative aspects, subscription manager 110 may be configured to identify the first computing device 152 as the hub device, to identify the second computing device 154 as a first non-hub device, and/or to identify the third computing device 156 as a second non-hub device, e.g., as described below.

In some demonstrative aspects, subscription manager 110 may be configured to identify the first computing device 152 as the non-hub device, to identify the second computing device 154 as a first hub device, and to identify the third computing device 156 as a second hub device, e.g., as described below.

In some demonstrative aspects, the subscription confirmation may include a predefined subscription confirmation provided by the hub device, e.g., as described below.

In one example, the subscription confirmation may include a purchased subscription which may be provided by an OEM of the hub device.

In some demonstrative aspects, the subscription confirmation may include a confirmation from a subscription provider that the non-hub device is subscribed to the subscription-restricted service, for example, via the subscription provider, e.g., as described below.

In some demonstrative aspects, subscription manager 110 may be configured to maintain one or more ring records corresponding to one or more respective hub devices, e.g., as described below.

In some demonstrative aspects, a ring record corresponding to the hub device may include an identifier (ID) of the hub device and one or more IDs of one or more non-hub devices, which are paired with the hub-device, e.g., as described below.

In some demonstrative aspects, subscription manager 110 may be configured to assign the hub device and the one or more non-hub devices of the ring record to the subscription, for example, based on an identification that a particular device of the ring record is to be assigned to the subscription, e.g., as described below.

In some demonstrative aspects, subscription manager 110 may be configured to identify a pairing between the hub device and an other non-hub device, which is to be assigned to the subscription, e.g., as described below.

In some demonstrative aspects, subscription manager 110 may be configured to assign the hub device and the one or more non-hub devices of the ring record to the subscription, and to add an ID of the other non-hub device to the ring record, for example, based on the identification of the pairing between the hub device and the other non-hub device, e.g., as described below.

In some demonstrative aspects, subscription manager 110 may be configured to identify a pairing between the hub device of the ring record and an unsubscribed non-hub device, which is unsubscribed to the subscription-restricted service, e.g., as described below.

In some demonstrative aspects, subscription manager 110 may be configured to assign the unsubscribed non-hub device to the subscription, and to add an ID of the unsubscribed non-hub device to the ring record, for example, based on the identification of the pairing between the hub device of the ring record and the unsubscribed non-hub device, e.g., as described below.

In some demonstrative aspects, subscription manager 110 may be configured to generate another ring record, e.g., as described below.

In some demonstrative aspects, subscription manager 110 may be configured to identify a pairing between a non-hub device of the ring record and an other hub device, which is unsubscribed to the subscription-restricted service, e.g., as described below.

In some demonstrative aspects, subscription manager 110 may be configured to generate an other ring record including an ID of the other hub device and an ID of the non-hub device, for example, based on the identification of the pairing between the non-hub device of the ring record and the other hub device, e.g., as described below.

In some demonstrative aspects, subscription manager 110 may be configured to assign any devices of the other ring record to the subscription, for example, based on an identification that the non-hub device of the ring record is assigned to the subscription, e.g., as described below.

In some demonstrative aspects, subscription manager 110 may be configured to maintain one or more customer records, e.g., as described below.

In some demonstrative aspects, a customer record may include a plurality of IDs of a plurality of computing devices assigned to the customer record, e.g., as described below.

In one example, the plurality of IDs of the plurality of computing devices assigned to the customer record may be maintained, for example, by the one or more ring records, e.g., as described below.

In some demonstrative aspects, the customer record may include a subscription validation indicator to indicate whether or not the subscription is valid for the plurality of computing devices of the customer record, e.g., as described below.

In some demonstrative aspects, subscription manager 110 may be configured to set the subscription validation indicator of the customer record to indicate that the subscription is valid for the plurality of computing devices of the customer record, for example, based on identification that a computing device of the plurality of computing devices of the customer record is to be assigned to the subscription, e.g., as described below.

In some demonstrative aspects, subscription manager 110 may be configured to identify that the computing device of the plurality of computing devices is to be assigned to the subscription, for example, based on the subscription confirmation, e.g., as described below.

In one example, the subscription conformation may include a predefined subscription confirmation provided by the computing device.

In another example, the subscription conformation may include a confirmation from the subscription provider that the computing device is subscribed to the subscription-restricted service via the subscription provider.

In some demonstrative aspects, subscription manager 110 may be configured to identify a pairing between a computing device of the plurality of computing devices of the customer record and an other computing device, which is unsubscribed to the subscription-restricted service, e.g., as described below.

In some demonstrative aspects, subscription manager 110 may be configured to add an ID of the other computing device to the customer record, for example, based on the identification of the pairing between the computing device of the plurality of computing devices of the customer record and the other computing device, e.g., as described below.

In some demonstrative aspects, subscription manager 110 may be configured to generate the customer record including an ID of the first computing device 152 and an ID of the second computing device 154, for example, based on the pairing between the first computing device 152 and the second computing device 154, e.g., as described below.

In some demonstrative aspects, subscription manager 110 may be configured to add an ID of the third computing device 156 to the customer record, for example, based on the identification of the pairing between the first computing device 152 and the third computing device 156, e.g., as described below.

In some demonstrative aspects, the customer record may include the terms-of-use information to define the one or more terms of use for the subscription, e.g., as described below.

In some demonstrative aspects, subscription manager 110 may be configured to restrict access of the plurality of computing devices to the subscription-restricted service, for example, according to the terms of use for the subscription, for example, as maintained in the customer record, e.g., as described below.

In other aspects, the customer record may include any other additional and/or alternative records and/or information.

In some demonstrative aspects, the customer record may include a logical entity, which may represent a collection of ring records.

In some demonstrative aspects, a ring record may include a logical entity that represents one hub device, e.g., a PC Hub, and one or more non-hub devices, which are paired with the hub device.

In some demonstrative aspects, a subscription may be valid, e.g., paid, purchased, in effect, and/or the like, or not-valid, e.g., not paid, expired, suspended, and/or the like.

In some demonstrative aspects, it may be enough to perform a pairing of a hub device with a non-hub device only once, e.g., as a onetime operation, for example, to register a connection between the non-hub device and the hub device.

In some demonstrative aspects, a non-hub device may be allowed to be paired with a plurality of hub devices. For example, the non hub-device and the plurality of hub devices may all be associated with one subscription.

In some demonstrative aspects, a hub device may be assigned with a ring ID, for example, once an application of the hub device is connected with a server, e.g., server 102, for example, for the first time.

In some demonstrative aspects, the hub device may be identified by the ring ID, for example, after the assignment of the ring ID.

In some demonstrative aspects, a non-hub device, e.g., any non-hub device, which is paired with a hub device of a ring record assigned with a ring ID, may be added to the ring record, and to a subscription associated with the ring record.

In one example, a computing device, e.g., the hub device, may connect with the server 102, and, moving forward, the computing device may be identified by the server 102, for example, using one or more security tokens, e.g., secure Open-Authentication (OAuth) 2.0 JavaScript Object Notation (JSON) Web Token (JWT) tokens.

In some demonstrative aspects, subscription manager 110 may be configured to provide a technical solution to support anonymity of a user, e.g., as described below.

In one example, subscription manager 110 may not be required to know who the user is.

In another example, subscription manager 110 may not connect between logical entities, e.g., a ring record, a subscription, and a customer record, and a real user behind them.

In some demonstrative aspects, subscription manager 110 may be configured to provide a technical solution to support associating to a subscription one or more hub devices and non-hub devices, which are paired with the hub devices, e.g., as described below.

In some demonstrative aspects, subscription manager 110 may be configured to provide a technical solution to support managing a subscription status for a computing device, e.g., each computing device, in a customer record, e.g., as described below.

In some demonstrative aspects, subscription manager 110 may assign a subscription for a customer record, for example, only when a hub device is paired with a non-hub device. For example, subscription manager 110 may not know to which subscription a hub device should be associated with, for example, when the hub device connects with the server 102 for the first time, for example, as the subscription may not be correlated with any user.

In some demonstrative aspects, once the subscription is assigned to the customer record, the customer record may include subscription information, e.g., terms of use, e.g., as described below.

In some demonstrative aspects, the subscription information may be propagated to one or more rings and devices of the one or more rings that are associated with the customer record, e.g., as described below.

Figure 2:
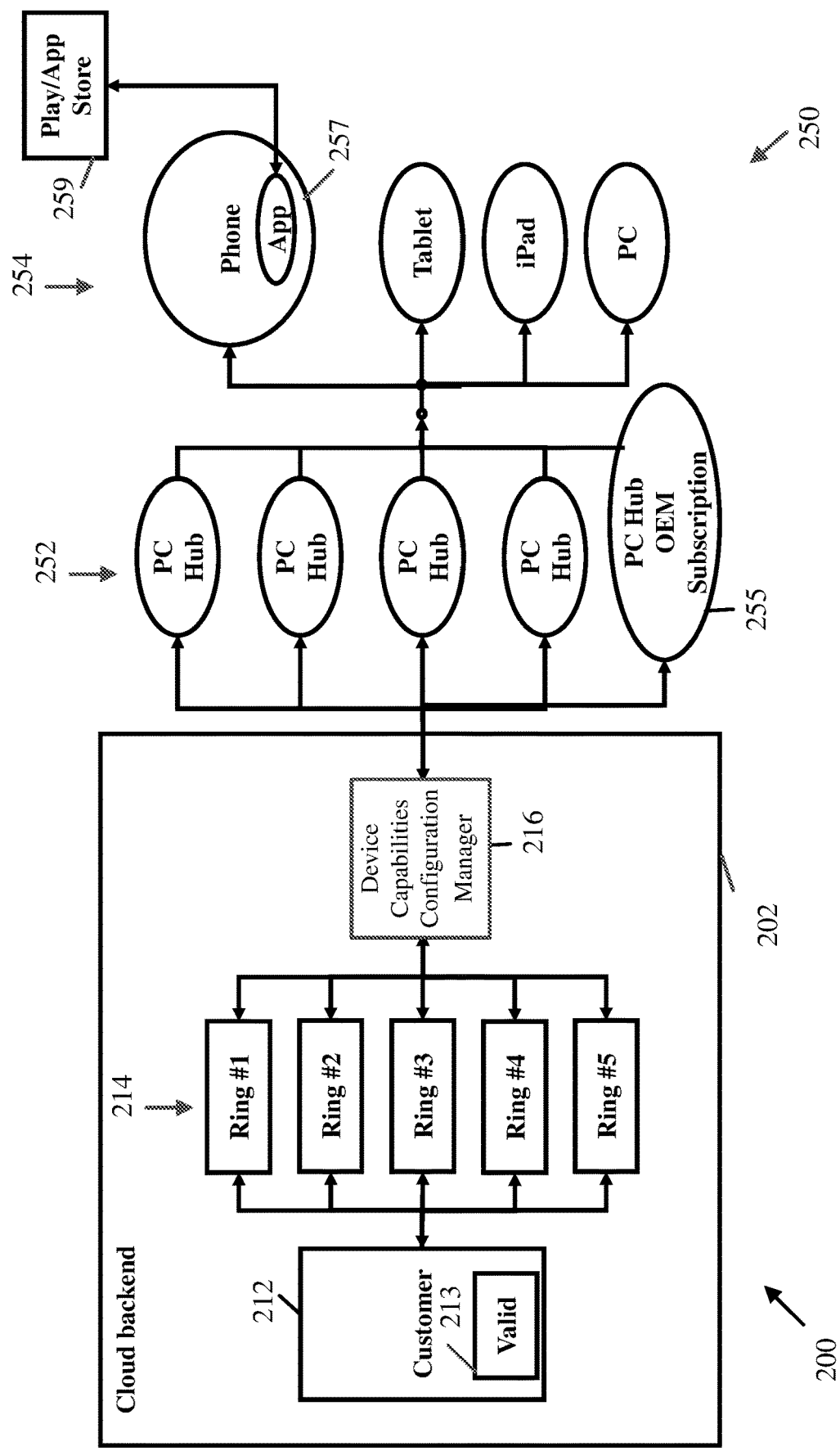
FIG. 2 is a schematic illustration of a system, in accordance with some demonstrative aspects.

Reference is made to FIG. 2, which schematically illustrates a system 200, in accordance with some demonstrative aspects.

In some demonstrative aspects, one or more elements of system 100 (FIG. 1) may be configured to implement and/or perform one or more functionalities of one or more elements of system 200.

In some demonstrative aspects, as shown in FIG. 2, system 200 may include a server 202 and a plurality of computing device 250. For example, server 102 (FIG. 1) may be configured to implement one or more elements of server 202, and/or to perform one or more functionalities of server 202.

In some demonstrative aspects, as shown in FIG. 2, server 202 may include a device capabilities configuration manager 216. For example, subscription manager 110 (FIG. 1) may be configured to implement one or more elements of device capabilities configuration manager 216, and/or to perform one or more functionalities of device capabilities configuration manager 216.

In some demonstrative aspects, device capabilities configuration manager 216 may be configured to manage, control and/or restrict one or more capabilities of an application, e.g., services, features, and/or the like, which a computing device 250 may be allowed to execute, e.g., as described below.

In some demonstrative aspects, device capabilities configuration manager 216 may be configured to provide to the application executed by a computing device 250 an indication of one or more capabilities of the application, e.g., services, features, and/or the like, which the computing device 250 may be allowed to execute, e.g., as described below.

In some demonstrative aspects, device capabilities configuration manager 216 may be configured to indicate to the application executed at a first computing device 250 that one or more first services of the application are to be allowed to be executed at the first computing device 250, e.g., as described below.

In some demonstrative aspects, device capabilities configuration manager 216 may be configured to indicate to the application executed at a second computing device 250, that one or more second services of the application are to be allowed to be executed at the second computing device 250, e.g., as described below.

In some demonstrative aspects, the one or more first services of the application may be different from the one or more second services of the application.

In some demonstrative aspects, device capabilities configuration manager 216 may be configured to indicate to an unsubscribed device that the one or more first services of the application are allowed to be executed by the unsubscribed device.

In some demonstrative aspects, the one or more first services may be provided by a first version of the application.

In some demonstrative aspects, the first version of the application may include a non-subscription version of the application, which does not require a subscription, e.g., as described below.

In one example, the first version of the application may include a free version of the application.

In some demonstrative aspects, the one or more second services may be provided by a second version of the application.

In some demonstrative aspects, the second version of the application may include a subscription-based version of the application, which requires a subscription.

In one example, the second version of the application may include a PRO version of the application, e.g., as described below.

In other aspects, the device capabilities configuration manager 216 may be configured to manage the services provided by the application according to any other additional or alternative criteria.

In some demonstrative aspects, device capabilities configuration manager 216 may be configured to indicate to the application executed at an unsubscribed device that the unsubscribed device is to be limited to the first services, for example, the services of the free version of the application.

In some demonstrative aspects, device capabilities configuration manager 216 may be configured to indicate to the application executed at a subscribed device that the subscribed device is to be allowed to execute the second services of the application, for example, the services of the PRO version of the application.

In some demonstrative aspects, as shown in FIG. 2, device capabilities configuration manager 216 may maintain a customer record 212 including a plurality of ring records 214.

In some demonstrative aspects, as shown in FIG. 2, the plurality of ring records 214 may correspond to a plurality of hub devices 252.

In some demonstrative aspects, as shown in FIG. 2, a customer record 212 may include a subscription validation indicator 213 to indicate whether or not the subscription is valid for the plurality of computing devices of the customer record 212.

In some demonstrative aspects, as shown in FIG. 2, a hub device 252 may be paired with a plurality of non-hub devices 254.

In some demonstrative aspects, device capabilities configuration manager 216 may be configured to set the subscription validation indicator 213 of the customer record 212 to indicate that the subscription is valid for the plurality of computing devices 250, for example, based on identification that a computing device of the plurality of computing devices 250 is to be assigned to a subscription.

In one example, device capabilities configuration manager 216 may be configured to indicate to a computing device 250, e.g., to each computing device 250, of the plurality of computing devices 250, for example, upon connection of the computing device 250 with the server 202, that the one or more subscription-restricted services of the application, e.g., subscription-restricted services of the PRO version, are to be allowed to be executed by the computing device 250.

In some demonstrative aspects, as shown in FIG. 2, device capabilities configuration manager 216 may identify that a hub device 255 of the plurality of computing devices 250 is to be assigned to the subscription, for example, based on a predefined subscription confirmation, e.g., an OEM subscription confirmation, which may be provided by the hub device 255.

In some demonstrative aspects, as shown in FIG. 2, device capabilities configuration manager 216 may identify that a non-hub device 257, e.g., a Smartphone, is to be assigned to the subscription, for example, based on a confirmation from a subscription provider 259, e.g., an App store, a Play store or the like, that non-hub device 257 is to be subscribed to the subscription-restricted service via the subscription provider 259.

In some demonstrative aspects, device capabilities configuration manager 216 may assign the subscription to all devices of the plurality of computing devices 250, for example, based on the identification that a computing device of the plurality of computing devices 250, e.g., the non-hub device 257 or the hub-device 255, is to be assigned to the subscription.

Figure 3:
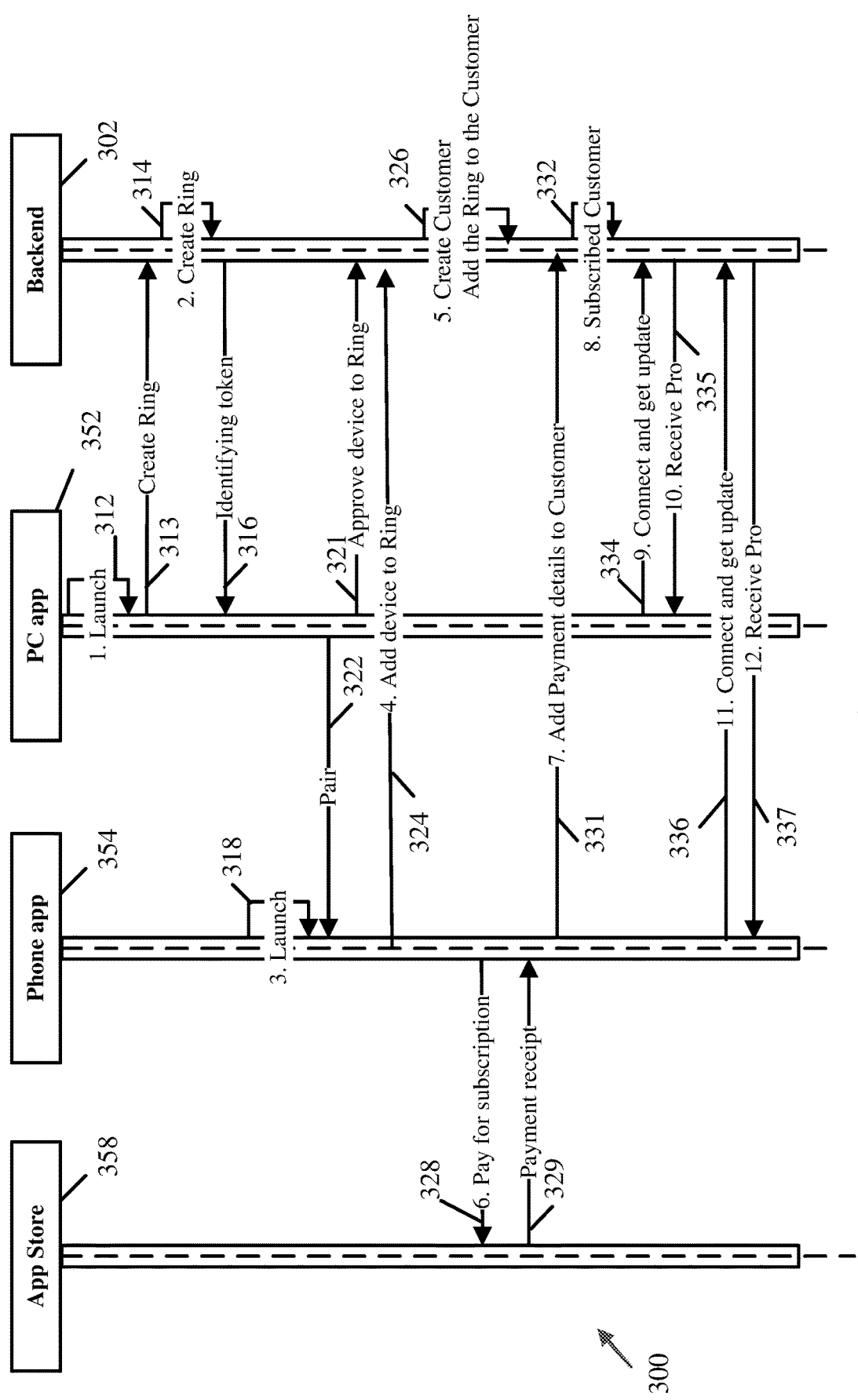
FIG. 3 is a schematic illustration of operations and communications of a subscription method to provide access to a subscription-restricted service of an application, in accordance with some demonstrative aspects.

Reference is made to FIG. 3, which schematically illustrates operations and communications of a subscription method to provide access to a subscription-restricted service of an application, in accordance with some demonstrative aspects.

In some demonstrative aspects, a server (backend) 302 may be configured to manage the operations and communications of the subscription process to subscribe the customer to the subscription.

In some demonstrative aspects, server 102 (FIG. 1) may be configured to perform one or more operations and/or functionalities of server 302.

In some demonstrative aspects, as indicated by arrow 312, a hub device (PC app) 352 may launch an application and may connect with the server 302.

In some demonstrative aspects, as indicated by arrow 314, server 302 may create a ring record based on an indication 313 of the launching of the application.

In one example, once an application of a new hub device is launched, the ring record may be created for this hub device, and the hub-device may be set as the ring's hub of the ring record.

In some demonstrative aspects, as indicated by arrow 316, server 302 may send to the hub device 352 an ID, e.g., an identifying token, of the hub device 352.

In some demonstrative aspects, as indicated by arrow 318, a non-hub device (Phone app) 354 may launch the application on the non-hub device 354.

In some demonstrative aspects, as indicated by arrow 322, the non-hub device 354 may be paired with the hub device 352.

In some demonstrative aspects, as indicated by arrow 324, server 302 may add an ID of the non-hub device 354 to the ring record, for example, based on the pairing between the non-hub device 354 and the hub device 352.

In some demonstrative aspects, as indicated by arrow 326, server 302 may create a customer record, for example, based on an approval 321 of the pairing between the hub device 352 and the non-hub device 354.

In one example, a newly created ring record may not be associated with a customer record of a subscription, for example, until the hub device of the ring record is paired with a non-hub device.

In one example, the ring record may be created when the hub device is paired with the non-hub device for the first time, and the ring record may become to be a child of the new created customer record of the subscription.

In some demonstrative aspects, as indicated by arrow 328, a user of the non-hub device 354 may pay for a subscription to purchase a subscription from a subscription provider (App store) 358.

In some demonstrative aspects, as indicated by arrow 329, the subscription provider 358 may send a subscription confirmation to the non-hub device 354.

In some demonstrative aspects, as indicated by arrow 331, the non-hub device 354 may send to the server 302 the subscription confirmation, e.g., including terms-of-use information to define one or more terms of use for the subscription.

In some demonstrative aspects, as indicated by arrow 332, server 302 may subscribe the customer to the subscription, for example, based on the subscription confirmation from the subscription provider 358, e.g., received via the non-hub device 354.

In some demonstrative aspects, as indicated by arrow 334, the hub device 352 may connect to the server 302.

In some demonstrative aspects, as indicated by arrow 335, server 302 may provide the hub device 352 with access to a subscription-restricted service of the application, for example, once the hub device 352 connects with the server 302, for example, based on the subscription confirmation associated with the customer record.

In some demonstrative aspects, as indicated by arrow 336, the non-hub device 354 may connect to the server 302.

In some demonstrative aspects, as indicated by arrow 337, server 302 may provide the non-hub device 354 with access to the subscription-restricted service of the application, for example, once the non-hub device 354 connects with the server 302, for example, based on the subscription confirmation. For example, device capabilities configuration manager 216 (FIG. 2) may indicate to the non-hub device 354, for example, upon the connection of the non-hub device 354 with the server 302, that the PRO version of the application is to be allowed to be executed by the non-hub device 354.

In one example, in a particular case, when a device, e.g., the non-hub device, is already associated and/or assigned to an other subscription, a generated ring record may become to be a child of the other subscription.

In some demonstrative aspects, an other non-hub device, e.g., any other non-hub device. which may be added to the ring record, may also be added to the customer record, and may be assigned to the subscription.

In some demonstrative aspects, an other non-hub device, e.g., any other non-hub device, which may be added to the ring record, may also be added to the customer record, and may be assigned to the subscription.

In some demonstrative aspects, a customer record may have multiple child rings, e.g., up to a predefined maximum number of rings per subscription.

Reference is made to FIGS. 4A, 4B, 4C, 4D, 4E and 4F, which schematically illustrate a method of providing access to a subscription-restricted service of an application, in accordance with some demonstrative aspects. For example, one or more of the operations of the method of FIG. 4 may be performed by one or more elements of a system, e.g., system 100 (FIG. 1), for example, a server, e.g., server 102 (FIG. 1), server 202 (FIG. 3), and/or server 302 (FIG. 3), a subscription manager, e.g., subscription manager 110 (FIG. 1), and/or subscription manager 210 (FIG. 2), a controller, e.g., controller 124 (FIG. 1), and/or a message processor, e.g., message processor 128 (FIG. 1).

Figure 4A:
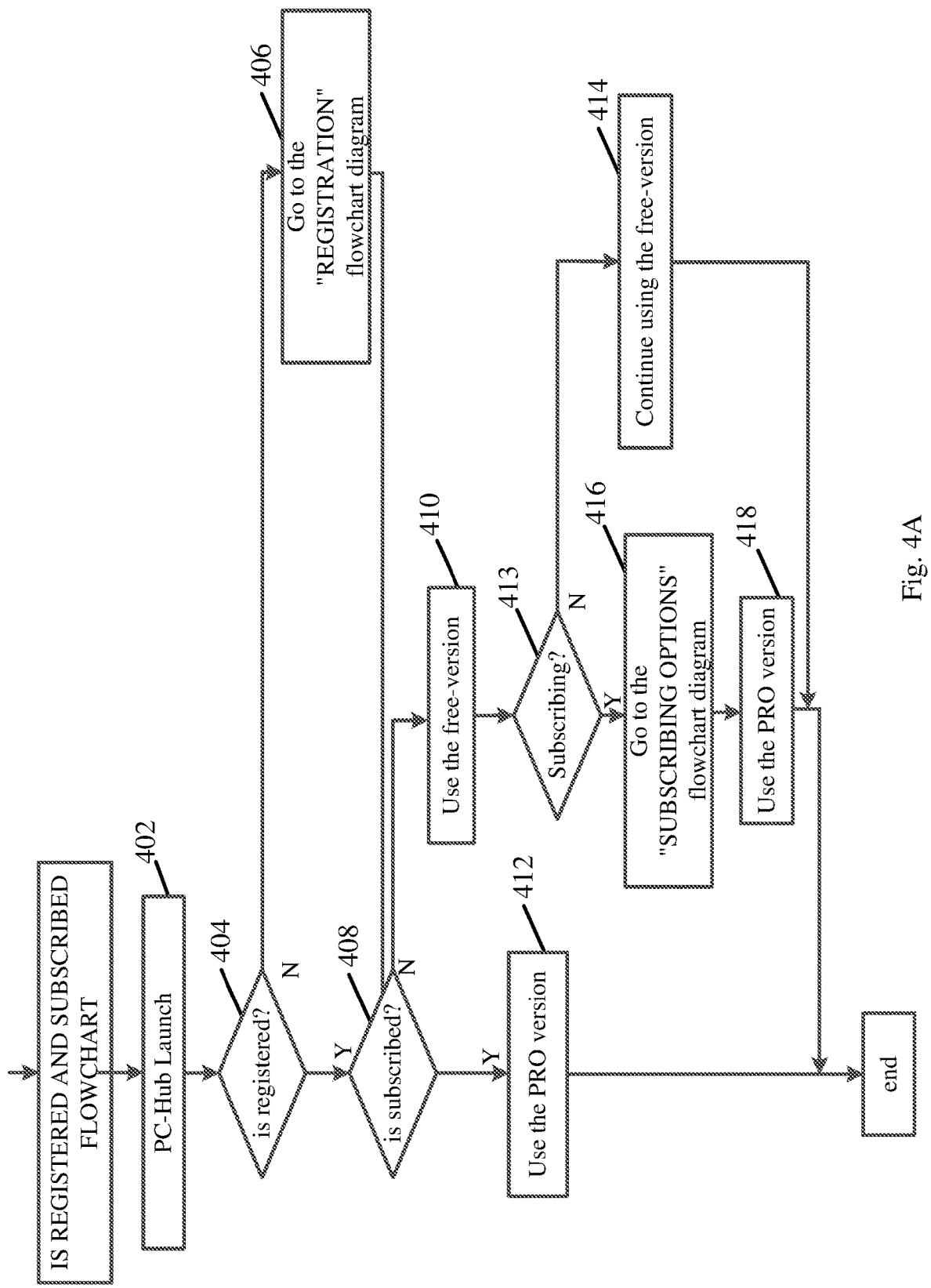
FIGS. 4A, 4B, 4C, 4D, 4E and 4F are schematic flow-chart illustrations of a method of providing access to a subscription-restricted service of an application, in accordance with some demonstrative aspects.

Referring to FIG. 4A, in some demonstrative aspects, as indicated at block 402, a user may launch an application at a hub device, denoted PC-Hub.

In some demonstrative aspects, as indicated at block 404, the method may include determining whether or not the hub device is registered. For example, subscription manager 110 (FIG. 1) may determine whether or not the hub device is registered, for example, upon launching of application 155 (FIG. 1) at the hub device.

In some demonstrative aspects, as indicated at block 406, the method may include registering the hub device, for example, if the hub device is not registered.

Figure 4B:
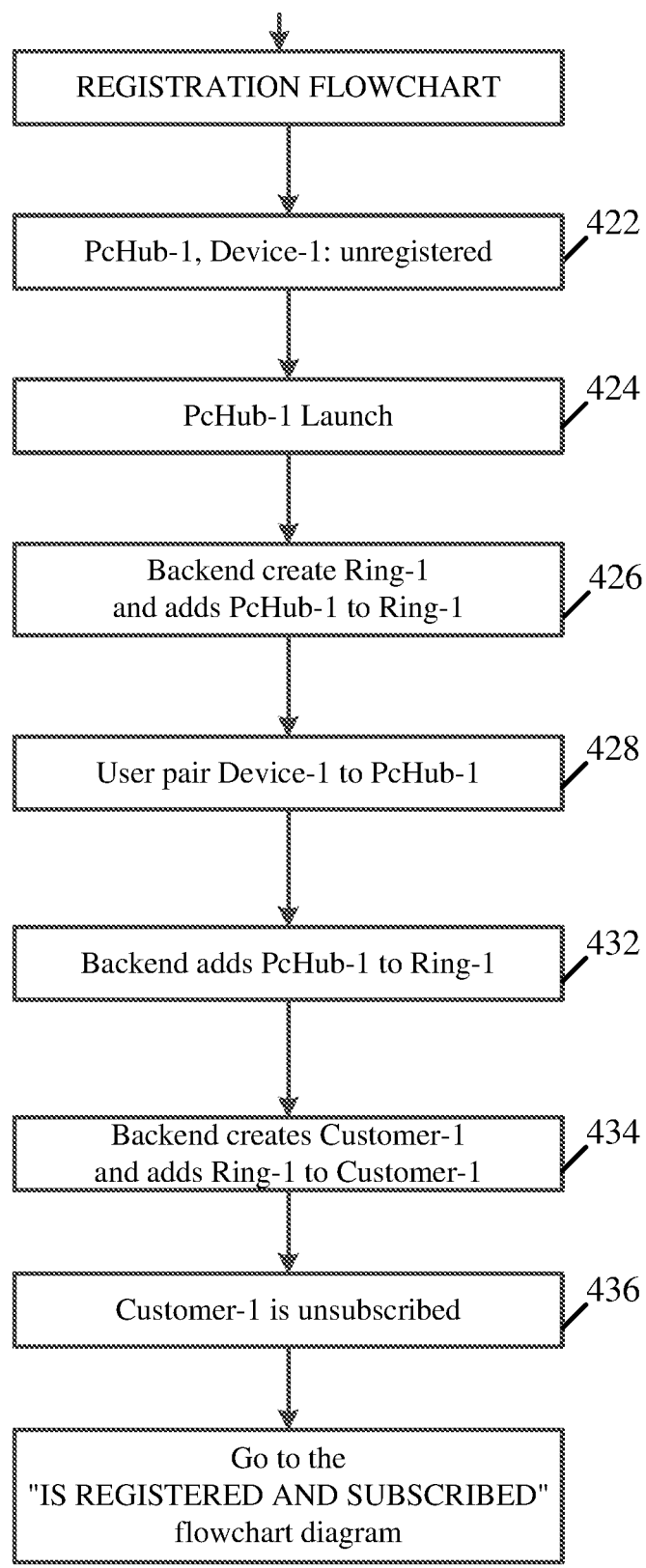

Referring to FIG. 4B, in some demonstrative aspects, as indicated at block 422, a hub device, denoted PcHub-1, and a non-hub device, denoted Device-1, may not be registered at a subscription manager.

In some demonstrative aspects, as indicated at block 424, a user may launch the application at the hub device PCHub-1.

In some demonstrative aspects, as indicated at block 426, the method may include generating a ring record, denoted Ring-1, and adding an ID of the hub device PcHub-1 to the ring record Ring-1. For example, subscription manager 110 (FIG. 1) may generate the ring record, e.g., upon launching of the application 155 (FIG. 1) at the hub device, and may add an ID of the hub device to the ring record.

In some demonstrative aspects, as indicated at block 428, a user may pair the hub device PcHub-1 with the non-hub device Device-1.

In some demonstrative aspects, as indicated at block 432, the method may include adding an ID of the non-hub device Device-1 to the ring record Ring-1, for example, based on the pairing between the hub device PcHub-1 and the non-hub device Device-1. For example, subscription manager 110 (FIG. 1) may add an ID of the non-hub device to the ring record, for example, based on the pairing between the hub device and the non-hub device.

In some demonstrative aspects, as indicated at block 434, the method may include generating a customer record, denoted Customer 1, including the ring record Ring-1, for example, based on the pairing between the hub device PcHub-1 and the non-hub device Device-1. For example, subscription manager 110 (FIG. 1) may generate the customer record including the ring record including an ID of the hub device and an ID of the non-hub device, for example, based on the pairing between the hub device and the non-hub device.

In some demonstrative aspects, as indicated at block 436, the customer record Customer-1 may not be assigned to a subscription, e.g., as long as a decision is not made to assign the customer record Customer-1 to the subscription.

Referring back to FIG. 4A, in some demonstrative aspects, as indicated at block 408, the method may include determining whether or not the hub device PcHub-1 or the non-hub device Device-1 is assigned to a subscription, for example, in case the hub device PcHub-1 and the non-hub device Device-1 are registered. For example, subscription manager 110 (FIG. 1) may determine whether or not the hub device or the non-hub device is assigned to the subscription.

In some demonstrative aspects, as indicated at block 410, the method may include prohibiting access of devices of the customer record Customer 1 to the subscription-restricted service of the application, e.g., while allowing the use of a free version of the application, for example, based on a determination that the hub device and the non-hub device are not assigned to the subscription. For example, subscription manager 110 (FIG. 1) may prohibit access of the hub device and the non-hub device to the subscription-restricted service of the application, for example, based on the determination that the hub device and the non-hub device are not assigned to the subscription. For example, device capabilities configuration manager 216 (FIG. 2) may indicate to the hub device, for example, upon connection of the hub device with the subscription manager 110 (FIG. 1), that the free version of the application is to be allowed to be executed by the hub device. For example, device capabilities configuration manager 216 (FIG. 2) may indicate to the non-hub device, for example, upon connection of the non-hub device with the subscription manager 110 (FIG. 1), that the free version of the application is to be allowed to be executed by the non-hub device.

In some demonstrative aspects, as indicated at block 413, the method may include determining whether or not a device of the customer record Customer 1, e.g., the hub device PcHub-1 or the non-hub device Device-1, is to be subscribed to the subscription-restricted service.

In some demonstrative aspects, as indicated at block 414, the method may include continuing to prohibit access of the devices of the customer record Customer 1 to the subscription-restricted service of the application, e.g., while allowing the free version of the application, for example, when it is determined that no device of the customer record Customer 1 is to be subscribed to the subscription-restricted service.

In some demonstrative aspects, as indicated at block 416, a device of the devices of the customer record Customer 1 may subscribe to the subscription-restricted service of the application, for example, using one or more subscribing options, e.g., as described below with reference to FIG. 4C.

In some demonstrative aspects, as indicated at blocks 418 and 412 the method may include assigning the devices of the customer record Customer 1 to the subscription and providing the devices of the customer record Customer 1 with access to the subscription-restricted service of the application, e.g., using a PRO version of the application, for example, based on an identification that a computing device of the customer record Customer 1 is to be subscribed to the subscription. For example, subscription manager 110 (FIG. 1) may provide the plurality of computing devices of the customer record with access to the subscription-restricted service of the application 155 (FIG. 1), for example, based on the identification that the computing device of the plurality of computing devices of the customer record is to be assigned to the subscription. For example, device capabilities configuration manager 216 (FIG. 2) may indicate to a computing device, e.g., to each computing device, of the plurality of computing devices of the customer record, for example, upon connection of the computing device with the subscription manager 110 (FIG. 1), that the PRO version of the application is to be allowed to be executed by the computing device.

Figure 4C:
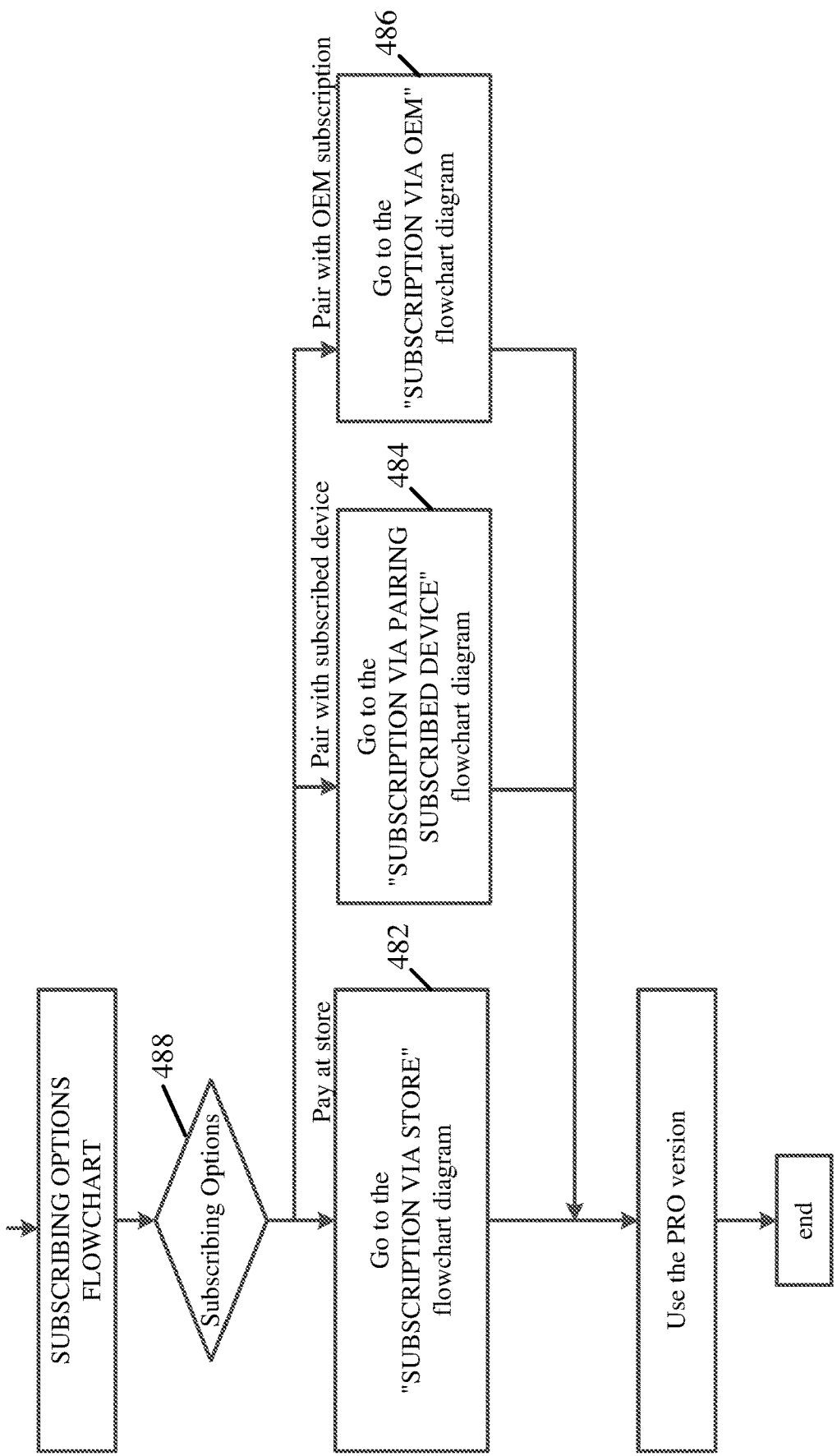

Referring to FIG. 4C, in some demonstrative aspects, as indicated at block 488, a device of the devices of the customer record Customer 1 may subscribe to the subscription-restricted service of the application, for example, using one or more subscribing options.

In some demonstrative aspects, as indicated at block 482, a subscription may be obtained via a subscription provider, e.g., as described below.

Figure 4D:
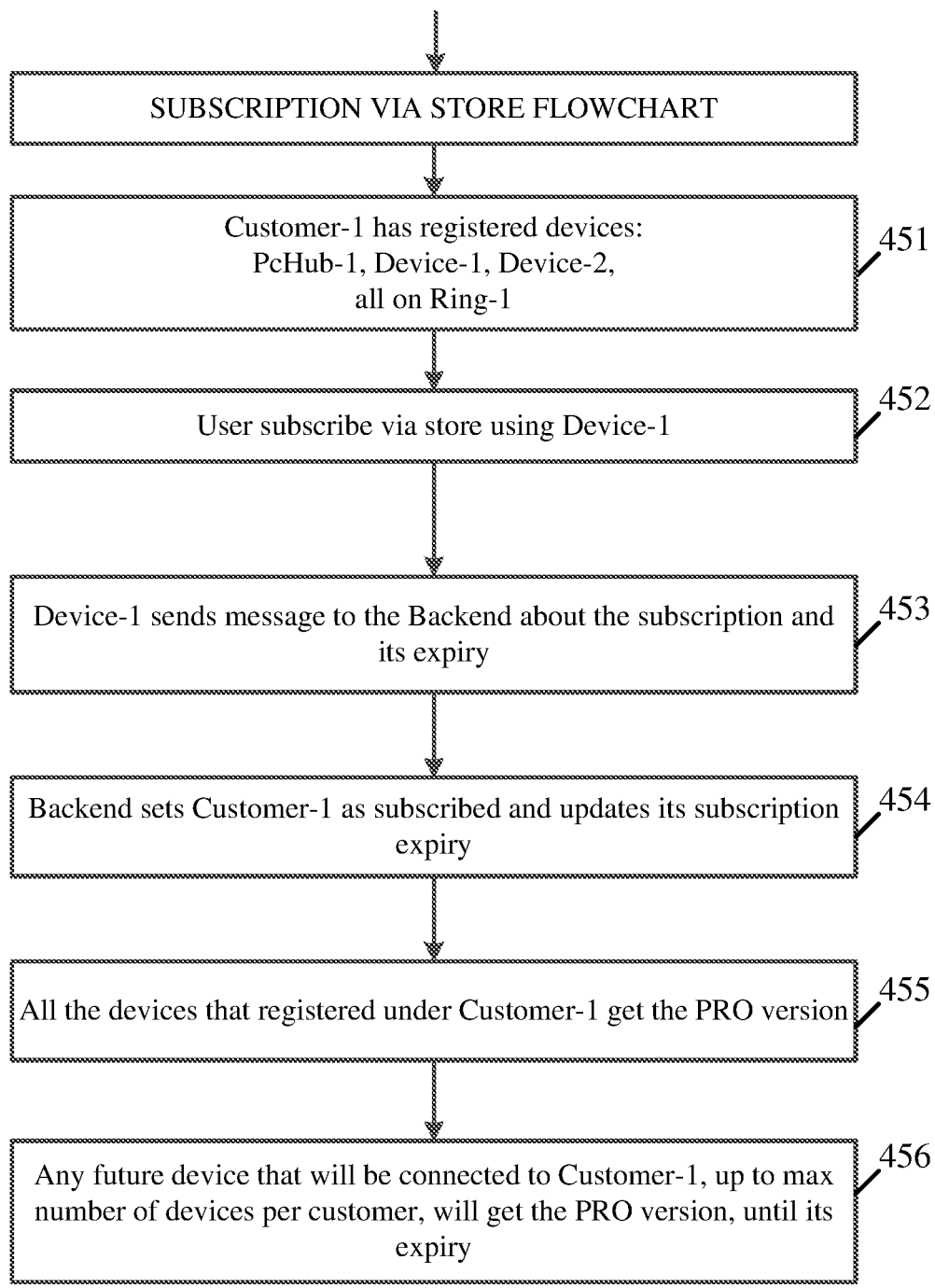

Referring to FIG. 4D, in some demonstrative aspects, as indicated at block 451, the customer record customer-1 may include the ring record ring-1, e.g., including the hub device PcHub-1, the non-hub device Device-1, and an other non-hub device, denoted Device-2.

In some demonstrative aspects, as indicated at block 452, the user may use the non-hub device Device-1 to subscribe to the subscription-restricted service of the application via a subscription provider, e.g., an App store.

In some demonstrative aspects, as indicated at block 453, the non-hub device Device-1 may send a subscription confirmation to the subscription manager, for example, including an anonymous payment receipt and terms of use for the subscription, e.g., including a condition for expiration of the subscription.

In some demonstrative aspects, as indicated at block 454, the method may include setting a subscription validation indicator of the customer record customer-1 to indicate that the subscription is valid for the plurality of computing devices of the customer record customer-1, and updating the terms of use for the subscription to include the expiration information. For example, subscription manager 110 (FIG. 1) may set the subscription validation indicator of the customer record to indicate that the subscription is valid for the customer record, for example, based on the subscription confirmation including the confirmation from the subscription provider.

In some demonstrative aspects, as indicated at block 455, the method may include providing the devices of the customer record customer-1 with access to the subscription-restricted service of the application, e.g., access to use the PRO version of the application, for example, based on the subscription confirmation. For example, subscription manager 110 (FIG. 1) may provide all devices of the customer record with access to the subscription-restricted service of the application 155 (FIG. 1), for example, based on the subscription confirmation including the confirmation from the subscription provider.

In some demonstrative aspects, as indicated at block 456, the method may include providing access to the subscription-restricted service of the application, e.g., to the PRO version, to any other device, which may be paired to a device of the customer record, for example, based on terms-of-use of the subscription, e.g., until expiration of the subscription and/or up to a maximal number of devices to be assigned to the subscription. For example, subscription manager 110 (FIG. 1) may provide any other device, which may be paired with a device of the customer record, with access to the subscription-restricted service of the application 155 (FIG. 1), for example, according to the terms-of use for the subscription.

For example, device capabilities configuration manager 216 (FIG. 2) may indicate to any other device, which may be paired with a device of the customer record, for example, upon connection of the other device with the subscription manager 110 (FIG. 1), that the PRO version of the application is to be allowed to be executed by the other device.

In one example, the user may pay the subscription provider for the subscription, e.g., at the play store or app store, for example, through the application.

In one example, the application at the non-hub device, e.g., a Multi-Device Experience (MDE) application, may receive the payment receipt from the subscription provider, and may send a subscription confirmation, e.g., including payment details, to the subscription manager, e.g., an MDE back-end.

In one example, the payment details may include a store receipt-ID and an expiry condition of the subscription, e.g., an expiry date, term, number of uses, or the like.

In one example, the payment details may not include any personal data of the user, e.g., an email, a user name, or any PII data.

In one example, the subscription manager may verify the payment details of the payment receipt, for example, against a backend of the subscription provider, and may set the 'Subscription' object of the customer record as a subscribed with an expiry date, e.g., once the payment details are verified.

Referring back to FIG. 4C, in some demonstrative aspects, as indicated at block 484, a subscription may be obtained by pairing a device of the customer record to a subscribed device.

Figure 4E:
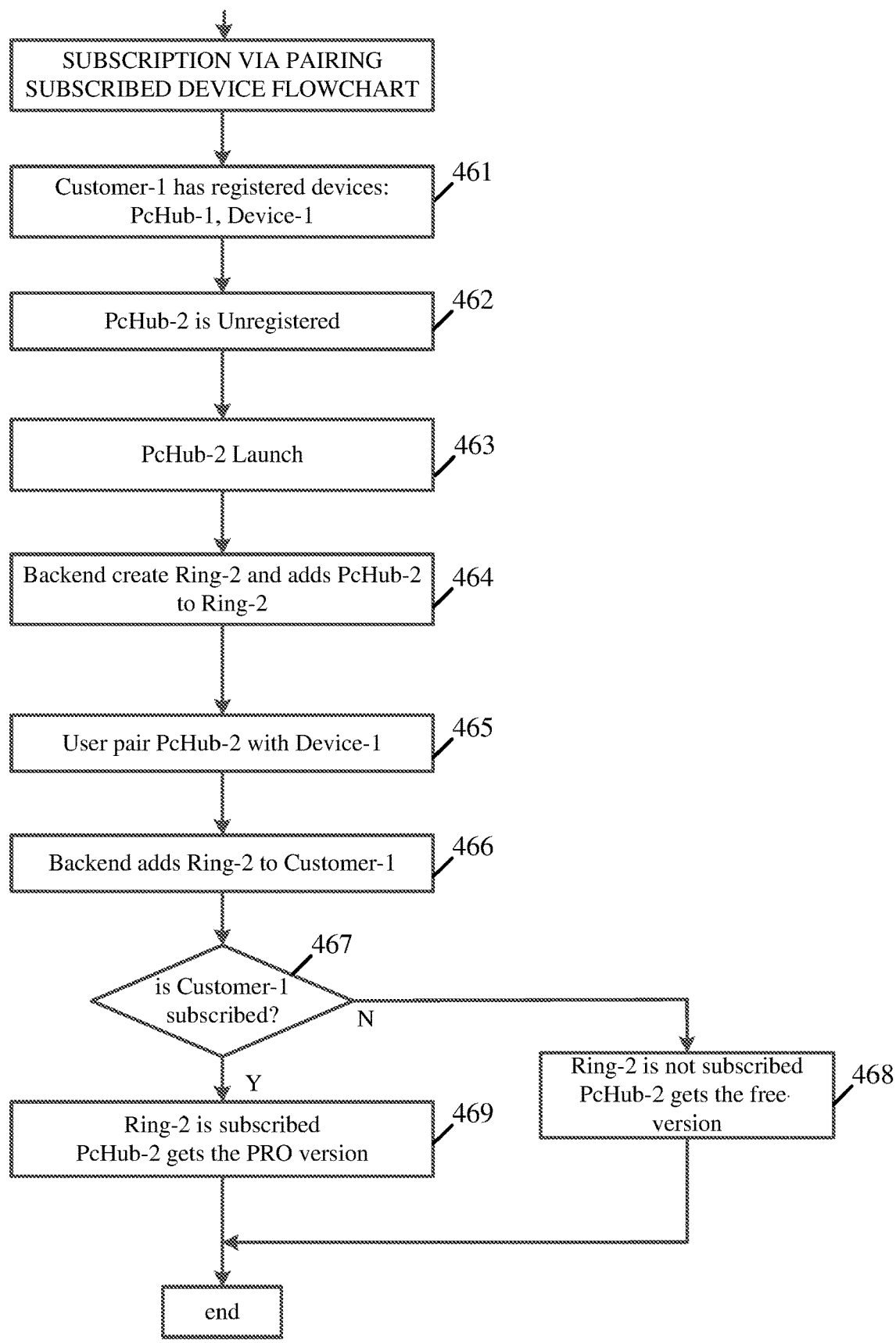

Referring to FIG. 4E, in some demonstrative aspects, as indicated at block 461, the customer record customer-1 may include the ring record ring-1 including the hub device PcHub-1 and the non-hub device Device-1.

In some demonstrative aspects, as indicated at block 462, an other hub device, denoted PcHub-2, may not yet be registered.

In some demonstrative aspects, as indicated at block 463, a user of the other hub device PcHub-2 may launch the application at the other hub device PcHub-2.

In some demonstrative aspects, as indicated at block 464, the method may include creating an other ring record, denoted Ring-2, and adding an ID of the other hub device PcHub-2 to the other ring record Ring-2. For example, subscription manager 110 (FIG. 1) may generate the other ring record based on the launching of the other hub device.

In some demonstrative aspects, as indicated at block 465, the user may pair the other hub device PcHub-2 with the non-hub device Device-1.

In some demonstrative aspects, as indicated at block 466, the method may include adding the other ring record Ring-2 to the customer record Customer-1, for example, based on the pairing between the other hub device PcHub-2 and the non-hub device Device-1. For example, subscription manager 110 (FIG. 1) may add the other ring record to the customer record, for example, based on the pairing between the non-hub device and the other hub device.

In some demonstrative aspects, as indicated at block 467, the method may include determining whether or not the customer record Customer-1 is associated with a valid subscription. For example, subscription manager 110 (FIG. 1) may determine whether or not the customer record is associated with a valid subscription.

In some demonstrative aspects, as indicated at block 468, devices of the other ring record Ring-2, e.g., the other hub device PcHub-2 and the non-hub device Device-1, may not be provided with access to the subscription-restricted service of the application, e.g., while allowing use of a free version of the application, for example, if the customer record is not associated with a valid subscription.

For example, device capabilities configuration manager 216 (FIG. 2) may indicate to a device, e.g., to each device, of the devices of the other ring record Ring-2, for example, upon connection of the device with the subscription manager 110 (FIG. 1), that the free version of the application is to be allowed to be executed by the device, for example, if the customer record is not associated with a valid subscription.

In some demonstrative aspects, as indicated at block 469, the method may include providing the devices of the other ring record Ring-2 with access to the subscription-restricted service of the application, e.g., to use a PRO version of the application, for example, if the customer record customer-1 is associated with a valid subscription.

For example, device capabilities configuration manager 216 (FIG. 2) may indicate to a device, e.g., to each device, of the devices of the other ring record Ring-2, for example, upon connection of the device with the subscription manager 110 (FIG. 1), that the PRO version of the application is to be allowed to be executed by the device, for example, if the customer record customer-1 is associated with a valid subscription.

Referring back to FIG. 4C, in some demonstrative aspects, as indicated at block 486, a subscription may be obtained via a predefined subscription, e.g., provided by an OEM of a computing device.

Figure 4F:
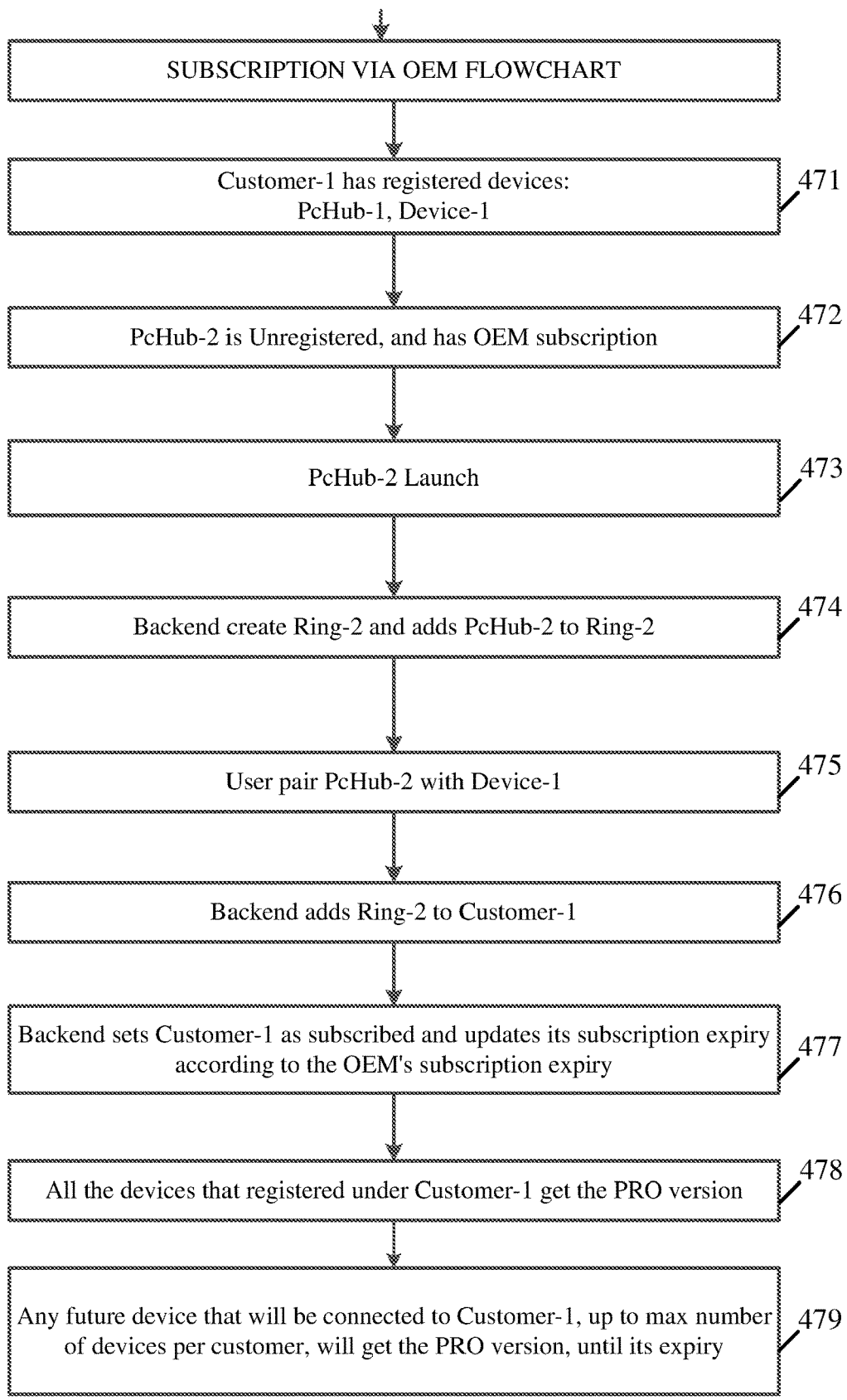

Referring to FIG. 4F, in some demonstrative aspects, as indicated at block 471, the customer record customer-1 may include the ring record ring-1 including the hub device PcHub-1 and the non-hub device Device-1.

In some demonstrative aspects, as indicated at block 472, an other hub device, denoted PcHub-2, may not be registered with the customer record customer-1, and may have an OEM subscription.

In some demonstrative aspects, as indicated at block 473, a user of the other hub device PcHub-2 may launch the application at the other hub device PcHub-2.

In some demonstrative aspects, as indicated at block 474, the method may include creating an other ring record, denoted Ring-2, and adding an ID of the other hub device PcHub-2 to the other ring record Ring-2. For example, subscription manager 110 (FIG. 1) may generate the other ring record based on the launching of the other hub device.

In one example, the application on the other hub device PcHub-2 may send to the subscription manager information corresponding to a maker or a manufacturer of the other hub device and/or a model the other hub device.

In one example, the subscription manager may mark a 'Subscription' object of the other hub device PcHub-2 and may set a subscription expiry date, for example, according to an agreement with the OEM.

In some demonstrative aspects, as indicated at block 475, the user may pair the other hub device PcHub-2 with the non-hub device Device-1.

In some demonstrative aspects, as indicated at block 476, the method may include adding the other ring record Ring-2 to the customer record Customer-1, for example, based on the pairing between the other hub device PcHub-2 and the non-hub device Device-1. For example, subscription manager 110 (FIG. 1) may add the other ring record to the customer record, for example, based on the pairing between the non-hub device and the other hub device.

In some demonstrative aspects, as indicated at block 477, the method may include setting a subscription validation indicator of the customer record customer-1 to indicate that the subscription is valid, and updating the terms of use for the subscription including the expiration information, for example, according to the terms of use for the OEM subscription, e.g., based on the addition of the "subscribed" ring record Ring-2 to the customer record customer-1. For example, subscription manager 110 (FIG. 1) may set the subscription validation indicator of the customer record to indicate that the subscription is valid, for example, based on the OEM subscription.

In some demonstrative aspects, as indicated at block 478, the method may include assigning the devices of the customer record customer-1, e.g., all devices of the customer record customer-1, to the OEM subscription, and providing the devices of the customer record customer-1 with access to the subscription-restricted service of the application, e.g., to use the PRO version of the application.

In some demonstrative aspects, as indicated at block 479, the method may include providing access to the subscription-restricted service of the application, e.g., to use the PRO version, to any other device, which may be paired to a device of the customer record, e.g., until expiration of the subscription, and/or until a maximal number of devices is assigned to the subscription. For example, subscription manager 110 (FIG. 1) may provide any other device, which may be paired with a device of the customer record, with access to the subscription-restricted service of the application 155 (FIG. 1), for example, according to the terms of-use for the subscription.

For example, device capabilities configuration manager 216 (FIG. 2) may indicate to any other device, which may be paired with a device of the customer record, for example, upon connection of the other device with the subscription manager 110 (FIG. 1), that the PRO version of the application is to be allowed to be executed by the other device.

Figure 5:
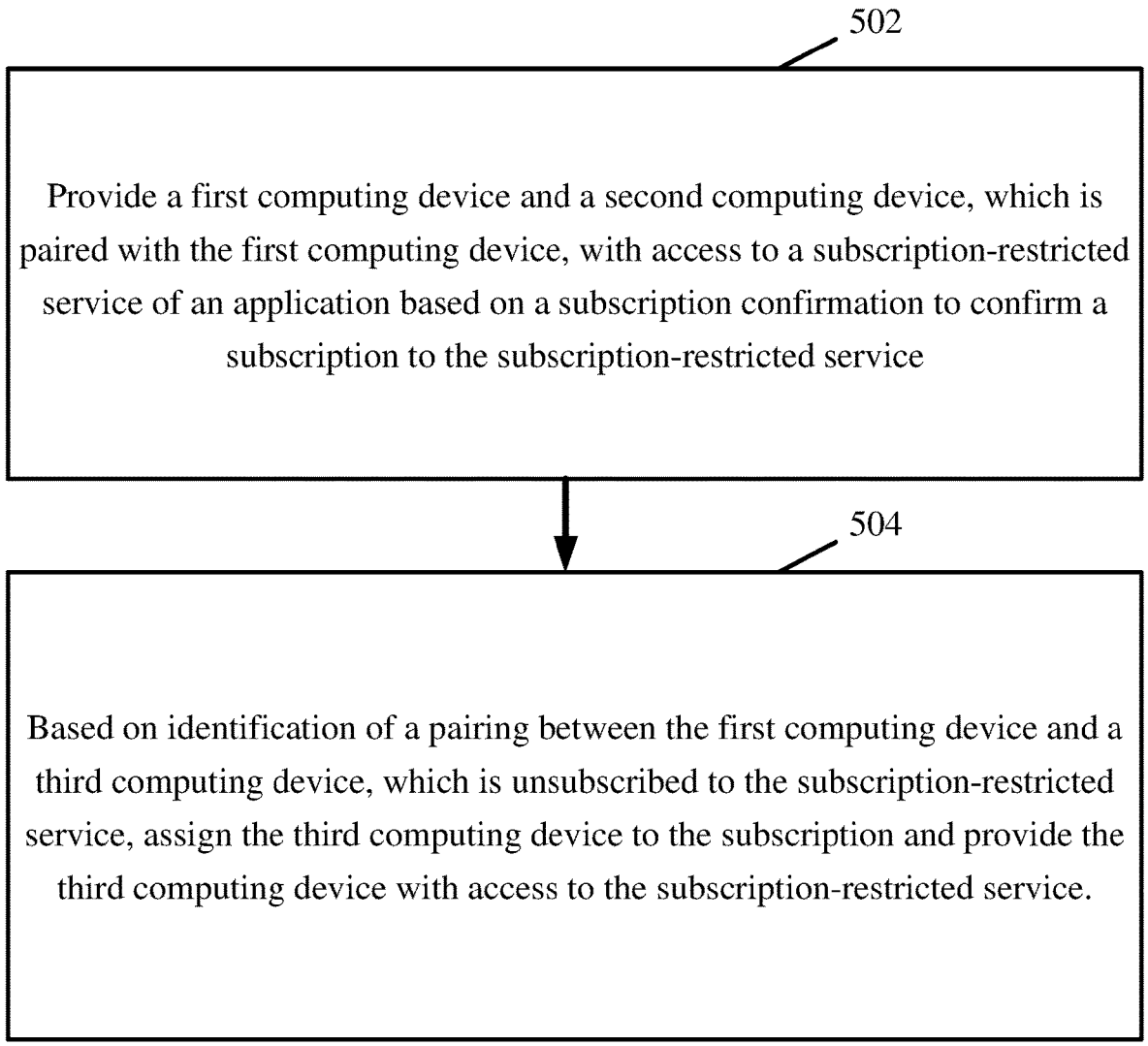
FIG. 5 is a schematic flow-chart illustration of a method of providing access to a subscription-restricted service of an application, in accordance with some demonstrative aspects.

Reference is made to FIG. 5, which schematically illustrates a method of providing access to a subscription-restricted service of an application, in accordance with some demonstrative aspects. For example, one or more of the operations of the method of FIG. 5 may be performed by one or more elements of a system, e.g., system 100 (FIG. 1), for example, a server, e.g., server 102 (FIG. 1), server 202 (FIG. 2), and/or server 302 (FIG. 3), a subscription manager, e.g., subscription manager 110 (FIG. 1), and/or subscription manager 210 (FIG. 2), a controller, e.g., controller 124 (FIG. 1), and/or a message processor, e.g., message processor 128 (FIG. 1).

As indicated at block 502, the method may include providing a first computing device and a second computing device, which is paired with the first computing device, with access to a subscription-restricted service of an application, for example, based on a subscription confirmation to confirm a subscription to the subscription-restricted service. For example, subscription manager 110 (FIG. 1) may be configured to provide the first computing device 152 (FIG. 1) and the second computing device 154 (FIG. 1), which is paired with the first computing device 152 (FIG. 1), with access to the subscription-restricted service of the application 155 (FIG. 1), for example, based on the subscription confirmation to confirm the subscription to the subscription-restricted service, e.g., as described above.

As indicated at block 504, the method may include, based on identification of a pairing between the first computing device and a third computing device, which is unsubscribed to the subscription-restricted service, assigning the third computing device to the subscription and providing the third computing device with access to the subscription-restricted service. For example, subscription manager 110 (FIG. 1) may be configured to assign the third computing device 154 (FIG. 1) to the subscription and provide the third computing device 154 (FIG. 1) with access to the subscription-restricted service, for example, based on the identification of the pairing between the first computing device 152 (FIG. 1) and the third computing device 154 (FIG. 1), e.g., as described above.

Figure 6:
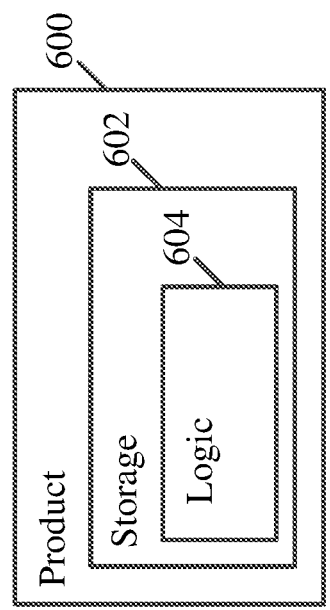
FIG. 6 is a schematic illustration of a product of manufacture, in accordance with some demonstrative aspects.

Reference is made to FIG. 6, which schematically illustrates a product of manufacture 600, in accordance with some demonstrative aspects. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at server 102 (FIG. 1), server 202 (FIG. 2), server 302 (FIG. 3), subscription manager 110 (FIG. 1), subscription manager 210 (FIG. 2), controller 124 (FIG. 1), and/or message processor 128 (FIG. 1); to cause server 102 (FIG. 1), server 202 (FIG. 2), server 302 (FIG. 3), subscription manager 110 (FIG. 1), subscription manager 210 (FIG. 2), controller 124 (FIG. 1), and/or message processor 128 (FIG. 1) to perform, trigger and/or implement one or more operations and/or functionalities; and/or to perform, trigger and/or implement one or more operations and/or functionalities described with reference to the FIGS. 1-5, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 600 and/or machine readable storage media 602 may include one or more types of computer-readable storage media capable of storing data, including volatile memory, non-volatile memory, removable or non-removable memory, erasable or non-erasable memory, writeable or re-writeable memory, and the like. For example, machine readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes a product comprising one or more tangible computer-readable non-transitory storage media comprising computer-executable instructions operable to, when executed by at least one processor, enable the at least one processor to cause a computing system to provide a first computing device and a second computing device, which is paired with the first computing device, with access to a subscription-restricted service of an application based on a subscription confirmation to confirm a subscription to the subscription-restricted service; and based on identification of a pairing between the first computing device and a third computing device, which is unsubscribed to the subscription-restricted service, assign the third computing device to the subscription and provide the third computing device with access to the subscription-restricted service.

Example 2 includes the subject matter of Example 1, and optionally, wherein the instructions, when executed, cause the computing system to identify one of the first computing device or the second computing device as a hub device to perform a hub functionality according to the application, and to identify an other one of the first computing device or the second computing device as a non-hub device to perform a non-hub functionality according to the application.

Example 3 includes the subject matter of Example 2, and optionally, wherein the instructions, when executed, cause the computing system to identify the first computing device as the hub device, to identify the second computing device as a first non-hub device, and to identify the third computing device as a second non-hub device.

Example 4 includes the subject matter of Example 2, and optionally, wherein the instructions, when executed, cause the computing system to identify the first computing device as the non-hub device, to identify the second computing device as a first hub device, and to identify the third computing device as a second hub device.

Example 5 includes the subject matter of any one of Examples 2-4, and optionally, wherein the subscription confirmation comprises a predefined subscription confirmation provided by the hub device.

Example 6 includes the subject matter of any one of Examples 2-4, and optionally, wherein the subscription confirmation comprises a confirmation from a subscription provider that the non-hub device is subscribed to the subscription-restricted service via the subscription provider.

Example 7 includes the subject matter of any one of Examples 2-6, and optionally, wherein the instructions, when executed, cause the computing system to maintain one or more ring records corresponding to one or more respective hub devices, wherein a ring record corresponding to the hub device comprises an identifier (ID) of the hub device and one or more IDs of one or more non-hub devices, which are paired with the hub-device; and based on an identification that a particular device of the ring record is to be assigned to the subscription, assign the hub device and the one or more non-hub devices of the ring record to the subscription.

Example 8 includes the subject matter of Example 7, and optionally, wherein the instructions, when executed, cause the computing system to, based on an identification of a pairing between the hub device and an other non-hub device, which is assigned to the subscription, assign the hub device and the one or more non-hub devices of the ring record to the subscription, and add an ID of the other non-hub device to the ring record.

Example 9 includes the subject matter of Example 7 or 8, and optionally, wherein the instructions, when executed, cause the computing system to, based on identification of a pairing between the hub device of the ring record and an unsubscribed non-hub device, which is unsubscribed to the subscription-restricted service, assign the unsubscribed non-hub device to the subscription and add an ID of the unsubscribed non-hub device to the ring record.

Example 10 includes the subject matter of any one of Examples 7-9, and optionally, wherein the instructions, when executed, cause the computing system to, based on identification of a pairing between a non-hub device of the ring record and an other hub device, which is unsubscribed to the subscription-restricted service, generate an other ring record comprising an ID of the other hub device and an ID of the non-hub device.

Example 11 includes the subject matter of Example 10, and optionally, wherein the instructions, when executed, cause the computing system to assign any devices of the other ring record to the subscription based on an identification that the non-hub device of the ring record is assigned to the subscription.

Example 12 includes the subject matter of any one of Examples 2-11, and optionally, wherein execution of a session of the subscription-restricted service involves a pair of participating devices comprising a participating hub device and a participating non-hub device paired with the participating hub device.

Example 13 includes the subject matter of any one of Examples 1-12, and optionally, wherein the instructions, when executed, cause the computing system to maintain one or more customer records, a customer record comprising a plurality of Identifiers (IDs) of a plurality of computing devices assigned to the customer record, and a subscription validation indicator to indicate whether or not the subscription is valid for the plurality of computing devices of the customer record; and based on identification that a computing device of the plurality of computing devices of the customer record is to be assigned to the subscription, set the subscription validation indicator of the customer record to indicate that the subscription is valid for the plurality of computing devices of the customer record.

Example 14 includes the subject matter of Example 13, and optionally, wherein the instructions, when executed, cause the computing system to identify that the computing device of the plurality of computing devices is to be assigned to the subscription based on the subscription confirmation.

Example 15 includes the subject matter of Example 13 or 14, and optionally, wherein the instructions, when executed, cause the computing system to, based on an identification of a pairing between a computing device of the plurality of computing devices of the customer record and an other computing device, which is unsubscribed to the subscription-restricted service, add an ID of the other computing device to the customer record.

Example 16 includes the subject matter of any one of Examples 13-15, and optionally, wherein the instructions, when executed, cause the computing system to generate the customer record comprising an ID of the first computing device and an ID of the second computing device based on the pairing between the first computing device and the second computing device.

Example 17 includes the subject matter of Example 16, and optionally, wherein the instructions, when executed, cause the computing system to add an ID of the third computing device to the customer record based on the identification of the pairing between the first computing device and the third computing device.

Example 18 includes the subject matter of any one of Examples 13-17, and optionally, wherein the customer record comprises terms-of-use information to define one or more terms of use for the subscription, wherein the instructions, when executed, cause the computing system to restrict access of the plurality of computing devices to the subscription-restricted service according to the terms of use for the subscription.

Example 19 includes the subject matter of Example 18, and optionally, wherein the one or more terms of use for the subscription comprises at least one of a maximal count of computing devices to be assigned to the subscription, or expiration information to indicate a condition for expiration of the subscription.

Example 20 includes the subject matter of any one of Examples 1-19, and optionally, wherein the subscription confirmation is to confirm that the first computing device is to be assigned to the subscription.

Example 21 includes the subject matter of any one of Examples 1-19, and optionally, wherein the subscription confirmation is to confirm that the second computing device is to be assigned to the subscription.

Example 22 includes the subject matter of any one of Examples 1-19, and optionally, wherein the subscription confirmation is to confirm that another computing device, which is paired with the first computing device or the second computing device, is to be assigned to the subscription.

Example 23 includes the subject matter of any one of Examples 1-22, and optionally, wherein the subscription confirmation comprises an anonymous payment receipt.

Example 24 includes the subject matter of any one of Examples 1-23, and optionally, wherein the subscription confirmation comprises terms-of-use information to define one or more terms of use for the subscription, wherein the instructions, when executed, cause the computing system to restrict access to the subscription-restricted service according to the one or more terms of use for the subscription.

Example 25 includes the subject matter of Example 24, and optionally, wherein the one or more terms of use for the subscription comprises at least one of a maximal count of computing devices to be assigned to the subscription, or expiration information to indicate a condition for expiration of the subscription.

Example 26 comprises a server configured to execute any of the described operations of any of Examples 1-25.

Example 27 comprises the subject matter of Example 26 and, optionally, comprising a communication interface.

Example 28 comprises a system comprising the server of Example 26 or 27, and one or more computing devices.

Example 29 comprises a method comprising any of the described operations of any of Examples 1-25.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A product comprising one or more tangible computer-readable non-transitory storage media comprising instructions operable to, when executed by at least one processor, enable the at least one processor to cause a computing system to:
   maintain one or more customer records, a customer record comprising a plurality of Identifiers (IDs) of a plurality of computing devices assigned to the customer record, and a subscription validation indicator to indicate whether or not a subscription to a subscription-restricted service of an application is valid for the plurality of computing devices of the customer record;
   based on identification that a computing device of the plurality of computing devices of the customer record is to be assigned to the subscription, set the subscription validation indicator of the customer record to indicate that the subscription is valid for the plurality of computing devices of the customer record;
   provide a first computing device and a second computing device, which is paired with the first computing device, with access to the subscription-restricted service of the application based on a subscription confirmation to confirm the subscription to the subscription-restricted service; and
   based on identification of a pairing between the first computing device and a third computing device, which is unsubscribed to the subscription-restricted service, assign the third computing device to the subscription and provide the third computing device with access to the subscription-restricted service.

2. The product of claim 1, wherein the instructions, when executed, cause the computing system to identify one of the first computing device or the second computing device as a hub device to perform a hub functionality according to the application, and to identify an other one of the first computing device or the second computing device as a non-hub device to perform a non-hub functionality according to the application.

3. The product of claim 2, wherein the instructions, when executed, cause the computing system to identify the first computing device as the hub device, to identify the second computing device as a first non-hub device, and to identify the third computing device as a second non-hub device.

4. The product of claim 2, wherein the instructions, when executed, cause the computing system to identify the first computing device as the non-hub device, to identify the second computing device as a first hub device, and to identify the third computing device as a second hub device.

5. The product of claim 2, wherein the subscription confirmation comprises a predefined subscription confirmation provided by the hub device.

6. The product of claim 2, wherein the subscription confirmation comprises a confirmation from a subscription provider that the non-hub device is subscribed to the subscription-restricted service via the subscription provider.

7. The product of claim 2, wherein the instructions, when executed, cause the computing system to:
   maintain one or more ring records corresponding to one or more respective hub devices, wherein a ring record corresponding to the hub device comprises an ID of the hub device and one or more IDs of one or more non-hub devices, which are paired with the hub-device; and based on an identification that a particular device of the ring record is to be assigned to the subscription, assign the hub device and the one or more non-hub devices of the ring record to the subscription.

8. The product of claim 7, wherein the instructions, when executed, cause the computing system to, based on an identification of a pairing between the hub device and an other non-hub device, which is assigned to the subscription, assign the hub device and the one or more non-hub devices of the ring record to the subscription, and add an ID of the other non-hub device to the ring record.

9. The product of claim 7, wherein the instructions, when executed, cause the computing system to, based on identification of a pairing between the hub device of the ring record and an unsubscribed non-hub device, which is unsubscribed to the subscription-restricted service, assign the unsubscribed non-hub device to the subscription and add an ID of the unsubscribed non-hub device to the ring record.

10. The product of claim 7, wherein the instructions, when executed, cause the computing system to, based on identification of a pairing between a non-hub device of the ring record and an other hub device, which is unsubscribed to the subscription-restricted service, generate an other ring record comprising an ID of the other hub device and an ID of the non-hub device.

11. The product of claim 10, wherein the instructions, when executed, cause the computing system to assign any devices of the other ring record to the subscription based on an identification that the non-hub device of the ring record is assigned to the subscription.

12. The product of claim 2, wherein execution of a session of the subscription-restricted service involves a pair of participating devices comprising a participating hub device and a participating non-hub device paired with the participating hub device.

13. The product of claim 1, wherein the customer record comprises terms-of-use information to define one or more terms of use for the subscription, wherein the instructions, when executed, cause the computing system to restrict access of the plurality of computing devices of the customer record to the subscription-restricted service according to the terms of use for the subscription.

14. The product of claim 1, wherein the instructions, when executed, cause the computing system to identify that the computing device of the plurality of computing devices is to be assigned to the subscription based on the subscription confirmation.

15. The product of claim 1, wherein the instructions, when executed, cause the computing system to, based on an identification of a pairing between a particular computing device of the plurality of computing devices of the customer record and an other computing device, which is unsubscribed to the subscription-restricted service, add an ID of the other computing device to the customer record.

16. The product of claim 1, wherein the instructions, when executed, cause the computing system to generate the customer record comprising an ID of the first computing device and an ID of the second computing device based on the pairing between the first computing device and the second computing device.

17. The product of claim 1, wherein the subscription confirmation comprises an anonymous payment receipt.

18. The product of claim 1, wherein the subscription confirmation comprises terms-of-use information to define one or more terms of use for the subscription, wherein the instructions, when executed, cause the computing system to restrict access to the subscription-restricted service according to the one or more terms of use for the subscription.

19. A server comprising:
a communication interface to communicate with a plurality of computing devices; and
a subscription manager comprising one or more processors configured to:
maintain one or more customer records, a customer record comprising a plurality of Identifiers (IDs) of a plurality of computing devices assigned to the customer record, and a subscription validation indicator to indicate whether or not a subscription to a subscription-restricted service of an application is valid for the plurality of computing devices of the customer record;
based on identification that a computing device of the plurality of computing devices of the customer record is to be assigned to the subscription, set the subscription validation indicator of the customer record to indicate that the subscription is valid for the plurality of computing devices of the customer record;
provide a first computing device and a second computing device, which is paired with the first computing device, with access to the subscription-restricted service of the application based on a subscription confirmation to confirm the subscription to the subscription-restricted service; and
based on identification of a pairing between the first computing device and a third computing device, which is unsubscribed to the subscription-restricted service, assign the third computing device to the subscription and provide the third computing device with access to the subscription-restricted service.

20. The server of claim 19, wherein the subscription manager is configured to identify one of the first computing device or the second computing device as a hub device to perform a hub functionality according to the application, and to identify an other one of the first computing device or the second computing device as a non-hub device to perform a non-hub functionality according to the application.

* * * * *